(12) United States Patent
Toussaint et al.

(10) Patent No.: US 10,315,951 B2
(45) Date of Patent: Jun. 11, 2019

(54) BOWTIE NANOANTENNAS AND METHODS OF USING THE SAME

(71) Applicant: The Board of Trustees of the University of Illinois, Urbana, IL (US)

(72) Inventors: Kimani C. Toussaint, Urbana, IL (US); Brian J. Roxworthy, Chevy Chase, MD (US); Abdul Monnag Bhuiya, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 297 days.

(21) Appl. No.: 15/181,810

(22) Filed: Jun. 14, 2016

(65) Prior Publication Data

US 2016/0370568 A1    Dec. 22, 2016

Related U.S. Application Data

(60) Provisional application No. 62/181,010, filed on Jun. 17, 2015.

(51) Int. Cl.
*G02B 21/32*     (2006.01)
*C03C 15/00*     (2006.01)
(Continued)

(52) U.S. Cl.
CPC ...... *C03C 17/3649* (2013.01); *C03C 17/3417* (2013.01); *C03C 17/36* (2013.01); *C03C 17/3657* (2013.01); *G02B 1/002* (2013.01); *B82Y 20/00* (2013.01); *B82Y 30/00* (2013.01); *B82Y 40/00* (2013.01); *C03C 2218/33* (2013.01)

(58) Field of Classification Search
CPC .......... B82Y 20/00; B82Y 30/00; B82Y 40/00
See application file for complete search history.

(56) References Cited

U.S. PATENT DOCUMENTS

2013/0115413 A1*  5/2013  Eres ...................... G01N 21/01
                                                 428/120

OTHER PUBLICATIONS

Kim, "Joining plasmonics with microfluidics: from convenience to inevitability," *Lab Chip*, vol. 12, pp. 3611-3623, 2012.
(Continued)

*Primary Examiner* — Seahvosh Nikmanesh
(74) *Attorney, Agent, or Firm* — Sunstein Kann Murphy & Timbers LLP

(57) ABSTRACT

A pillar-nanoantenna array structure is fabricated with a substrate to which pairs of pillars are coupled, where the pillars are characterized either by a thermal conductance less than 0.1 μW/deg or by transparency and a height exceeding thickness by at least a factor of two. Metallic caps atop a neighboring pair of pillars are separated by no more than 50 nm. An image-capture structure may be formed by modifying reflectance of a portion of the structure by heating of the portion by electromagnetic radiation. The array may be plastically deformed by raster scanning an electron beam across the array, exciting plasmon modes in the conducting particles thereby inducing a gradient force between neighboring conducting particles, and deforming neighboring pillars in such a manner as to vary the spacing separating neighboring conducting particles. A technique of plasmon-assisted etching provides for fabricating specified planar pattern of metal outside a cleanroom environment.

10 Claims, 21 Drawing Sheets
(15 of 21 Drawing Sheet(s) Filed in Color)

(51) Int. Cl.
*H01J 37/30* (2006.01)
*C03C 23/00* (2006.01)
*C03C 17/36* (2006.01)
*G03F 7/20* (2006.01)
*C03B 23/00* (2006.01)
*C03C 17/34* (2006.01)
*G02B 1/00* (2006.01)
*B82Y 20/00* (2011.01)
*B82Y 40/00* (2011.01)
*B82Y 30/00* (2011.01)

(56) References Cited

OTHER PUBLICATIONS

Roxworthy, et al., "Application of Plasmonic Bowtie Nanoantenna Arrays for Optical Trapping, Stacking, and Sorting," *Nano Letters*, pp. 796-802, 2012.

Roxworthy, et al., "Plasmonic nanotweezers: strong influence of adhesion layer and nonstructure orientation on trapping performance," *Optics Expresss*, vol. 20, Issue No. 9, pp. 9591-9603, Apr. 2012.

Zheng, et al., "Electron-beam-assisted superplastic shaping of nanoscale amorphous silica," *Nature Communications*, vol. 1, Issue No. 3, 8 pages, Jun. 2010.

Zheng, et al., "Electron Beam Manipulation of Nanoparticles," *Nano Letters*, vol. 12, pp. 5644-5648, 2012.

\* cited by examiner

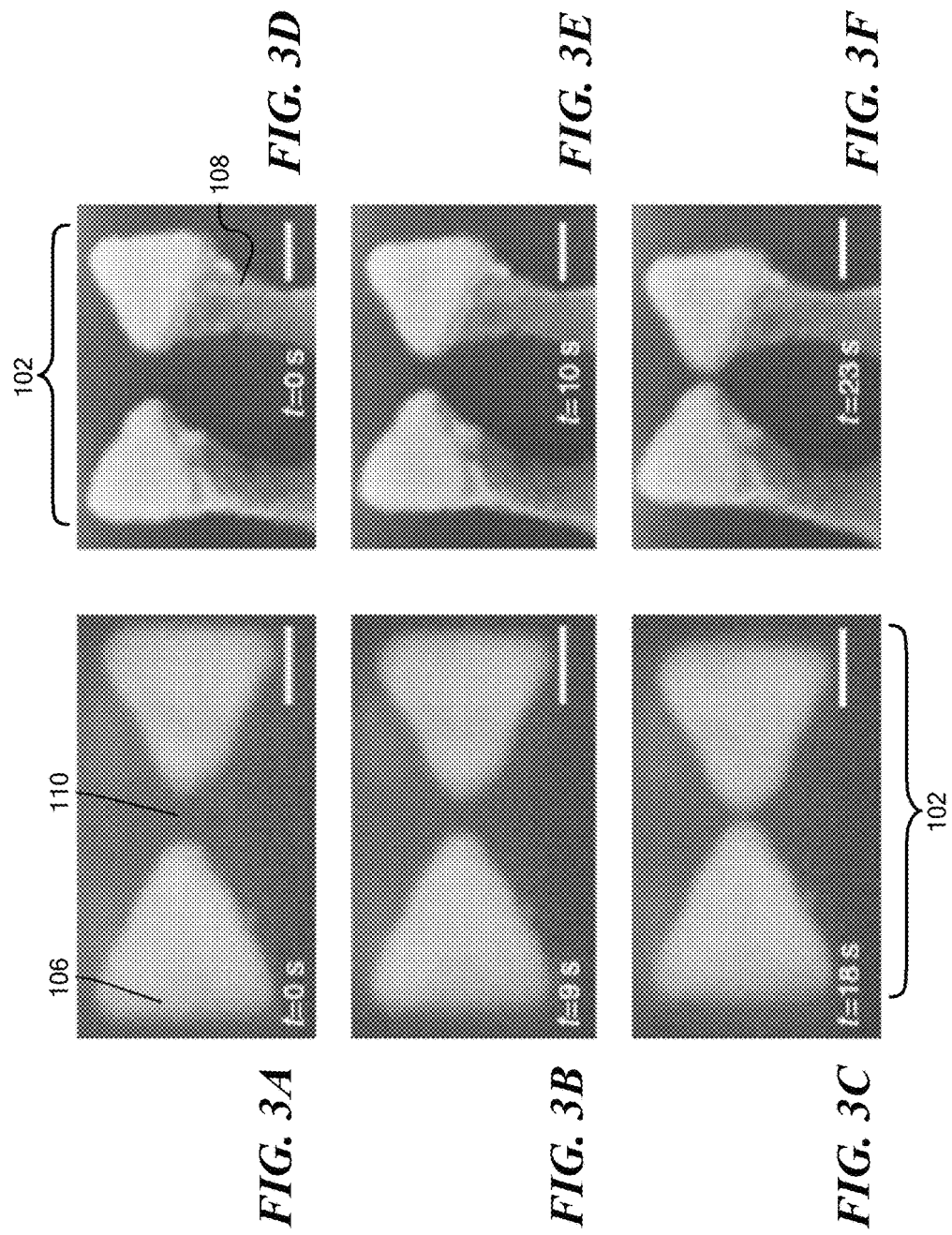

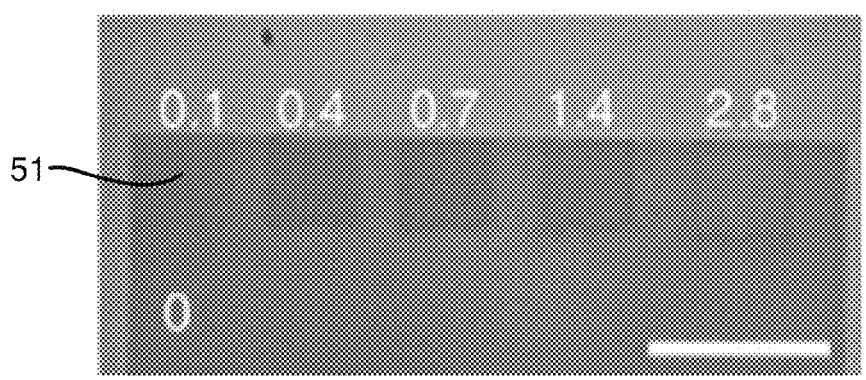
*FIG. 5*
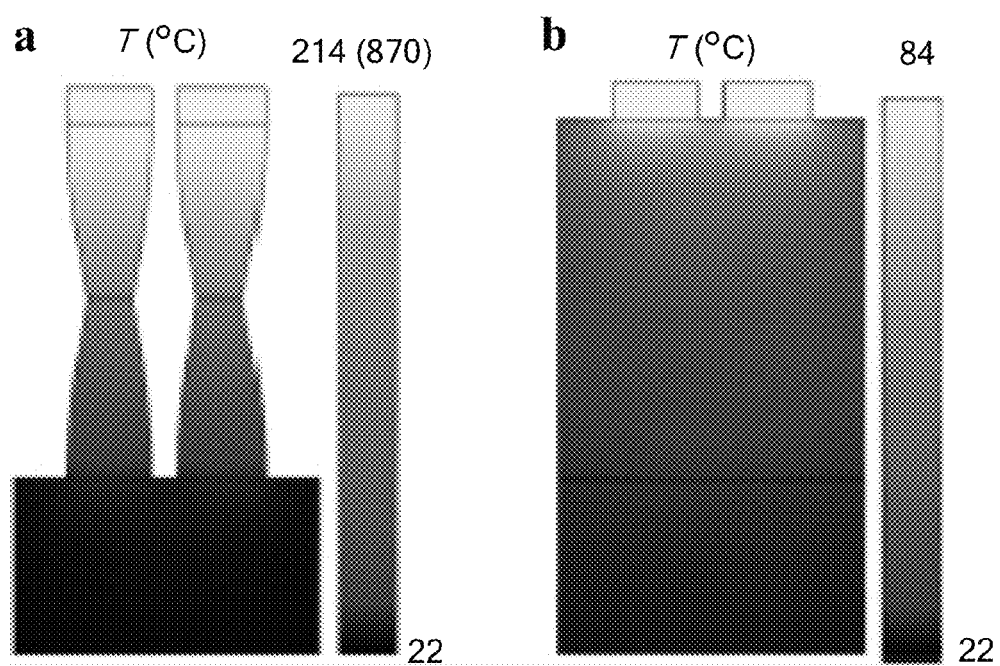
*FIG. 6A*  *FIG. 6B*

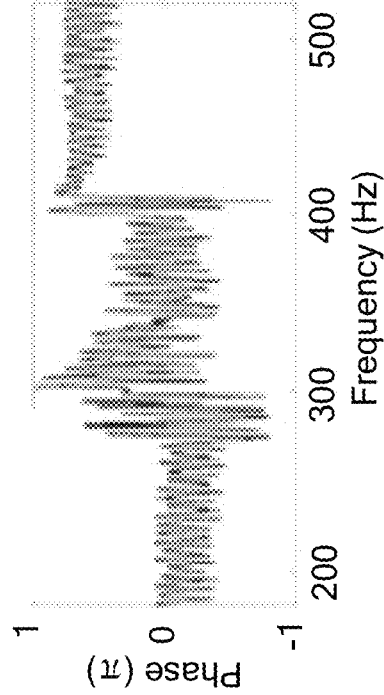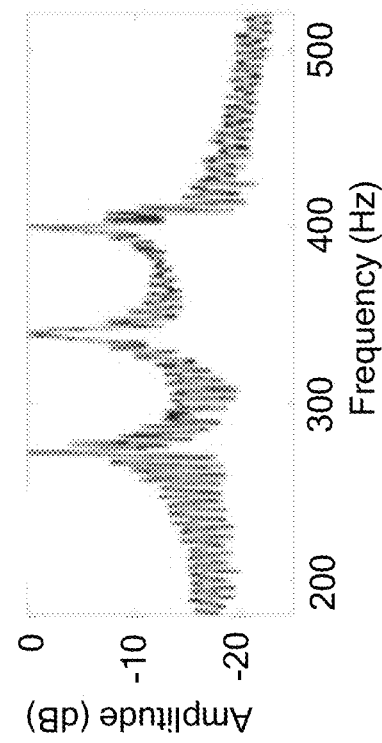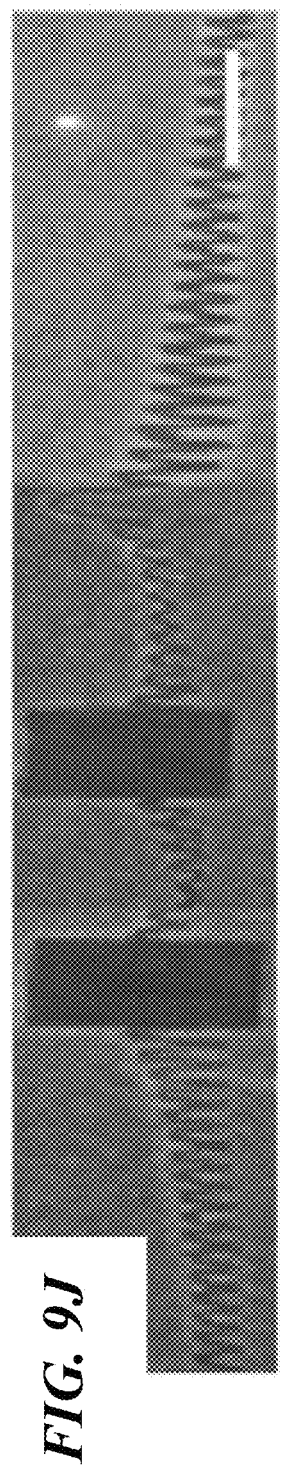

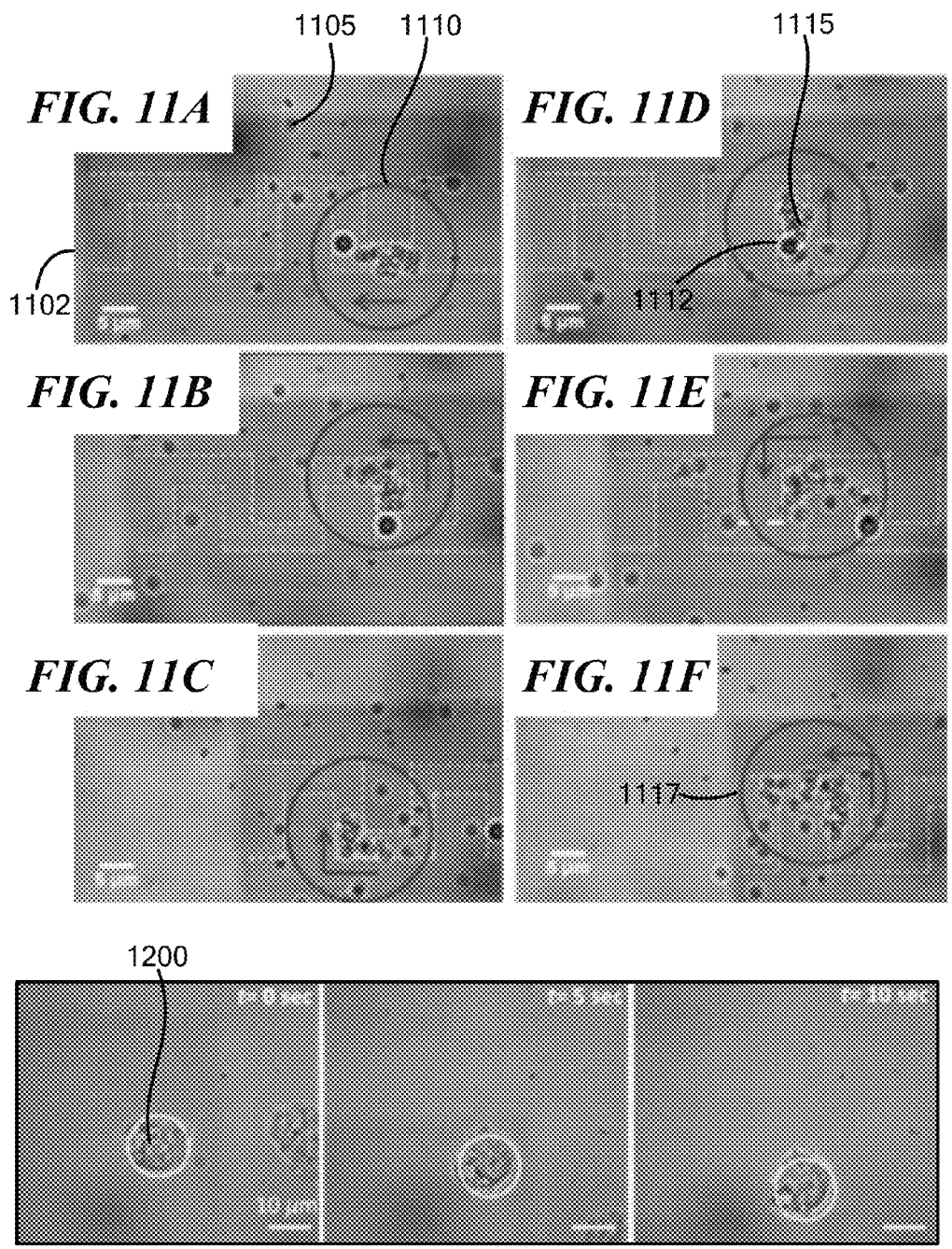

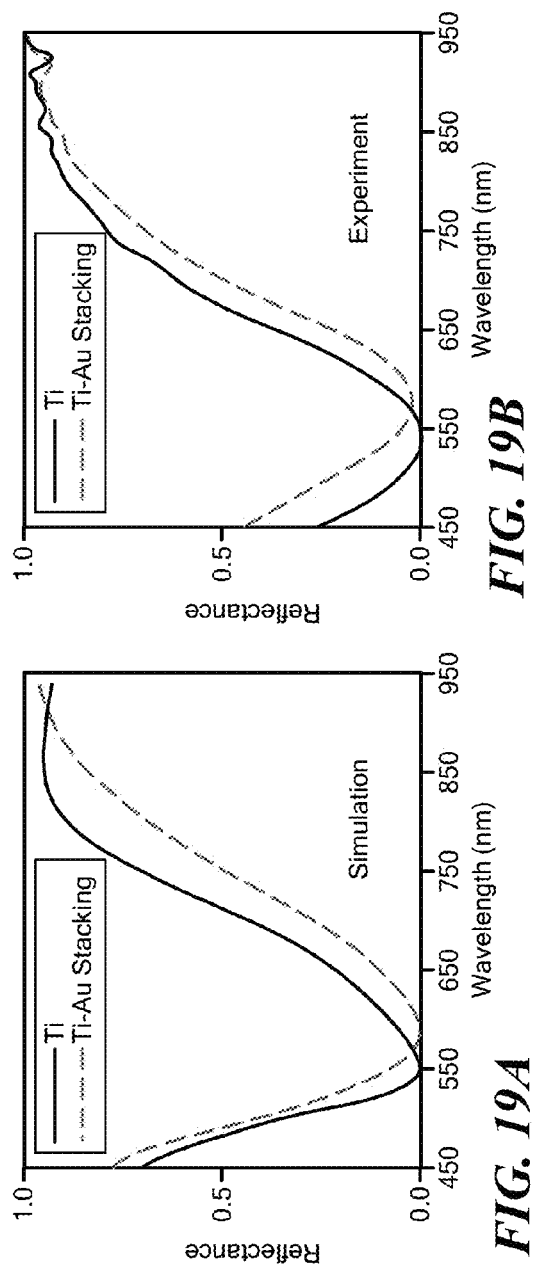
FIG. 19A
FIG. 19B
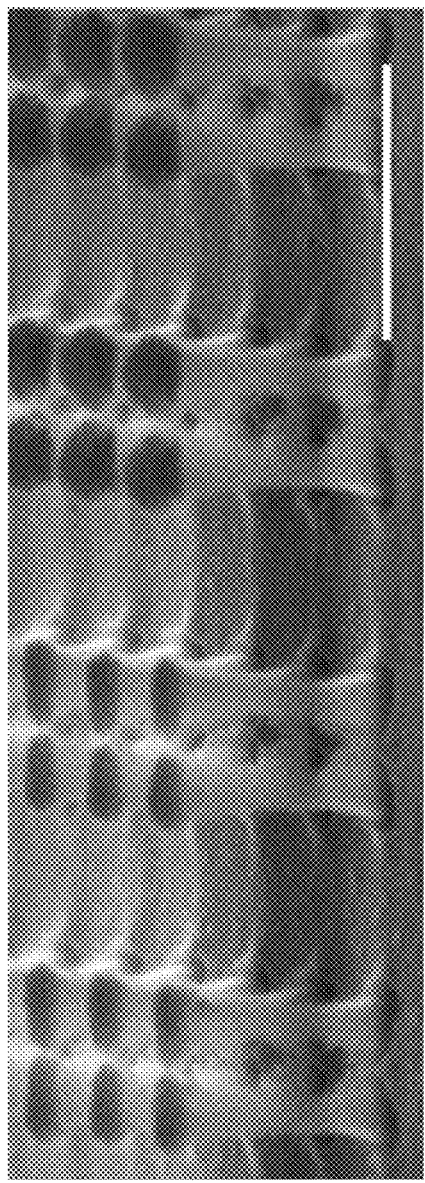
FIG. 19C

BOWTIE NANOANTENNAS AND METHODS OF USING THE SAME

The present application claims the priority of U.S. Provisional Patent Application 62/181,010, filed Jun. 17, 2015, and incorporated herein by reference.

TECHNICAL FIELD

The present invention relates to methods for fabricating and using plasmonic antennas, and, more particularly, to fabricating metal nanoantennas on insulating pillars.

BACKGROUND ART

The large near-field intensity gradients afforded by plasmonic nanotweezers have been an area of increasing interest, particularly in the field of lab-on-a-chip (LOC) devices. Indeed, the attributes of amplified optical forces and flexibility in shaping the optical potential energy landscape are well-suited for trapping nanoparticles, investigating colloidal dynamics, and manipulating biological species. In addition, arrays of gold bowtie nanoantennas (BNAs) are capable of yielding optical trapping efficiencies that are twenty times greater than conventional optical trapping, permitting the use of low input power densities.

In recent years, applications of plasmonic nanoantennas have focused on optical trapping, basic studies in thermoplasmonics, solar energy harvesting and biosensing. The particularly attractive feature of metal nanoantennas is their ability to concentrate light into subwavelength regions with local field enhancements as high as $10^4$. Generally, nanoantennas are fabricated bound to a dielectric substrate, with their geometry and functionality remaining fixed after fabrication. Still, there has been a recent push to place the nanoantennas on pillars, thereby elevating them above the substrate, in order to increase the field/sensitivity enhancement for sensor applications. Indeed, it has been shown that an array of Si pillar-supported nanoantennas could enhance the signal for surface enhanced Raman scattering. To date, however, known fabrication techniques have limited pillar materials to metals or to a semiconductor substrate material, typically silicon, which is not optically transparent.

Thus, innovative techniques are needed in order to provide advantageously for a wide array of applications of plasmonic nanoantennas with insulating pillars. Such techniques are described below.

Superplastic deformation of silica has been induced by electron beams in nanowires, as reported by Zheng et al., "*Electron-beam assisted superplastic shaping of nanoscale amorphous silica,*" Nat. Commun., 1:24, pp. 1-8 (2010) (hereinafter, "Zheng 2010"). Organized superplastic deformation of an array structure, which has never been suggested, would be tremendously advantageous in the context of methods and application discussed below.

A background review of prior art lab-on-a-chip nano architectures was provided by Kim, "*Joining plasmonics with microfluidics: from convenience to inevitability,*" Lab Chip, vol. 12, pp. 3611-23 (2012) (hereinafter "Kim 2012"), which publication is incorporated herein by reference.

The following prior art publications provide further background teachings relating to optical trapping by antenna arrays that are directly deposited onto a substrate. Both publications are incorporated herein by reference:

Roxworthy, et al., "*Application of Plasmonic Bowtie Nanoantenna Arrays for Optical Trapping, Stacking, and Sorting, Nano Lett.*, pp. 796-802 (2012); and Roxworthy, et al., "*Plasmonic nanotweezers: strong influence of adhesion layer and nanostructure orientation on trapping performance,*" Opt. Exp., pp. 9591-9603 (2012).

SUMMARY OF EMBODIMENTS OF THE INVENTION

In accordance with embodiments of the invention, a structure is provided, having a surface and an array of pairs of pillars coupled to the substrate. The pillars are characterized by a thermal conductance less than 0.1 µW/deg, and have a metallic cap atop each pillar, wherein the metallic caps atop at least one neighboring pair of pillars are separated with respect to each other by no more than 50 nm. In an alternate embodiment of the invention, the pillars are substantially transparent in a visible portion of the spectrum and characterized by a ratio of height to thickness exceeding 2.0.

In accordance with other embodiments of the present invention, the metallic caps may be substantially triangular and the substrate surface may be substantially planar. The pillars may be substantially transparent in a specified portion of the electromagnetic spectrum.

The substrate and the pillars may be composed of an identical material, and a layer of conducting material may intervene between the substantially planar surface of the substrate and the pillars. The substrate and the pillars may be $SiO_2$, and the layer of conducting material intervening between the substantially planar surface of the substrate and the pillars may be indium tin oxide.

In accordance with further embodiments of the present invention, an image-capture structure is provided that has a comprising substrate with a substantially planar surface and an array of thermally isolating pillars coupled to the substrate, with the thermally isolating pillars characterized by a ratio of height to thickness exceeding 2.0 and a thermal conductance less than 0.1 µW/deg. The image-capture structure also has a metallic cap atop each thermally isolating pillar, wherein reflectance at a specified wavelength of a portion of the image-capture structure is modified by heating of the portion by electromagnetic radiation.

In accordance with another aspect of the present invention, a method is provided for plastically deforming an array of pillar-bowtie-nanoantennas. The method has steps of:

raster scanning an electron beam across the array of pillar-bowtie-nanoantennas;

exciting plasmon modes in the conducting particles thereby inducing a gradient force between neighboring conducting particles; and deforming neighboring pillars in such a manner as to vary the spacing separating neighboring conducting particles.

In further embodiments of the invention, raster scanning the electron beam may include scanning electrons accelerated to energies in a range of 10-20 keV.

In accordance with yet another aspect of the present invention, a method is provided for producing a custom plasmonic potential energy landscape for optically trapping particles. The method has steps of:

forming a structure that comprises an array of pillars coupled to a substrate having a substantially planar surface, the pillars characterized by a thermal conductance less than 0.1 µW/deg, the pillars capped by substantially triangular metallic cap atop each insulating pillar such that pairs of neighboring caps are separated with respect to each other by no more than 50 nm; and deforming neighboring pillars in such a manner as to plastically vary the spacing separating neighboring conducting particles in a specified pattern.

In other embodiments of the present invention, deforming neighboring pillars may include exciting plasmon modes in the conducting particles with an electron beam thereby inducing a gradient force between neighboring conducting particles.

In accordance with another aspect of the present invention, a method is provided for optically trapping a particle, the method comprising illuminating one of the pillar nanoantenna array structures with light from an illuminating source in such a manner as to create a specified gradient of optical forces acting on the particle so as to constrain motion of the particle.

In accordance with still another aspect of the present invention, a method is provided for tuning a plasmonic response of an array of pillar-bowtie-nanoantennas. The method has steps of:

raster scanning an electron beam across the array of pillar-bowtie-nanoantennas;

exciting plasmon modes in the conducting particles with the electron beam thereby inducing a gradient force between neighboring conducting particles; and deforming neighboring pillars in such a manner as to vary the spacing separating neighboring conducting particles.

In accordance with another aspect yet of the present invention, a method of manufacture is provided for fabricating an array of nanoantennas. The method has steps of:

depositing a layer of $SiO_2$ on a substrate of $SiO_2$ coated with indium-tin-oxide;

evaporating a chromium adhesion layer over the layer of $SiO_2$;

evaporating a layer of gold over the chromium adhesion layer;

patterning antennas in the layer of gold using electron beam lithography;

depositing a protective layer of nickel over the layer of gold; and etching the layer of $SiO_2$ using reactive ion etching to form pillars down to the indium-tin-oxide.

The antennas may be substantially triangular, and the step of depositing a layer of $SiO_2$ may include plasma-enhanced chemical vapor deposition. The deposited layer of $SiO_2$ may be between 400 nm and 600 nm in thickness, while the layer of gold may be between 40 nm and 60 nm in thickness. The substantially triangular antennas may form bowties with separations between adjacent triangles in a range between 10 nm and 50 nm.

In accordance with a further aspect of the present invention, a method is provided for forming a specified planar pattern of metal. The method may have steps of:

forming a structure in accordance with either of claim 1 or 2; and directing laser illumination to debond metal nanoantennas from silica pillars in accordance with a specified pattern.

The specified pattern may form an optical component, such as one chosen from a group including a lens, a grating, a Fresnel zone plate and a fork dislocation grating.

In accordance with a further aspect of the invention still, a method may be provided for recording an image, having steps of:

forming a structure in accordance with either of claim 1 or 2; and thermally inducing morphological changes in the metallic caps such as to change spectral reflectivity properties of the structure as a function of position on the surface.

In other embodiments, thermally inducing morphological changes may include encoding audio information, and, more particularly, the audio information may be encoded in a spectral domain, but is not necessarily so encoded.

BRIEF DESCRIPTION OF THE DRAWINGS

The present patent or application file contains at least one drawing executed in color. Copies of this patent with color drawing(s) will be provided by the Patent and Trademark Office upon request and payment of necessary fee.

The foregoing features of the invention will be more readily understood by reference to the following detailed description, taken with reference to the accompanying drawings, in which:

FIG. 3A-3C are top views of a pair of nanoantennas subject to an increasing duration of e-beam exposure, while FIG. 3D-3F are corresponding perspective views, in accordance with an embodiment of the present invention.

FIG. 4A depicts an arrangement for measuring spectral reflectivity of plasmonic p-BNA arrays, while

FIG. 5 shows color change in a p-BNA structure due to increasing illumination flux, in accordance with an embodiment of the present invention.

FIG. 6A shows calculated temperature distributions of a pillar-bowtie antenna under illumination conditions of 0.1 and 0.4 mW/$\mu$m$^2$, while FIG. 6B shows the same for substrate-bound BNAs and 0.4 mW/$\mu$m$^2$ incident flux.

FIGS. 9H and 9I are logarithmic versions of the spectra of the audio signal, while FIG. 9J shows filtering of an audio signal by masking in plasmonic film in the spectral domain, in accordance with an embodiment of the present invention.

FIGS. 11A-11F show photographic depictions of plasmonic-film-based particle guiding.

FIGS. 12A-12C show the trapping of rat macrophages using p-BNAs, in accordance with an embodiment of the present invention.

FIG. 15A is a right-field image of a fabricated diffraction grating 1501 with an overlaid schematic of the grating structure 1503 and relevant parameters noted. The scale bar represents 20-μm. FIGS. 15B and 15C show simulated normalized reflected intensity, for normally incident horizontal and vertical input polarization, respectively, as a function of input wavelength λ and the diffraction angle $\theta_r$. FIGS. 15D-15G are experimentally obtained intensity distributions and corresponding cross-sectional intensity profiles for illumination wavelengths of 543, 660, 685 and 785 nm, respectively. For each case, the polarization state of the incident beam is indicated in the top right corner by the arrows.

FIG. 19A plots the calculated reflectance spectra for Ti p-BNAs and stacked Ti—Au p-BNAs, while FIG. 19B plots measured counterparts of FIG. 19A. FIG. 19C is an SEM image of corresponding Ti p-BNAs and Ti—Au p-BNAs. The scale bar is 500 nm.

DETAILED DESCRIPTION OF EMBODIMENTS OF THE INVENTION

Figure 1A:
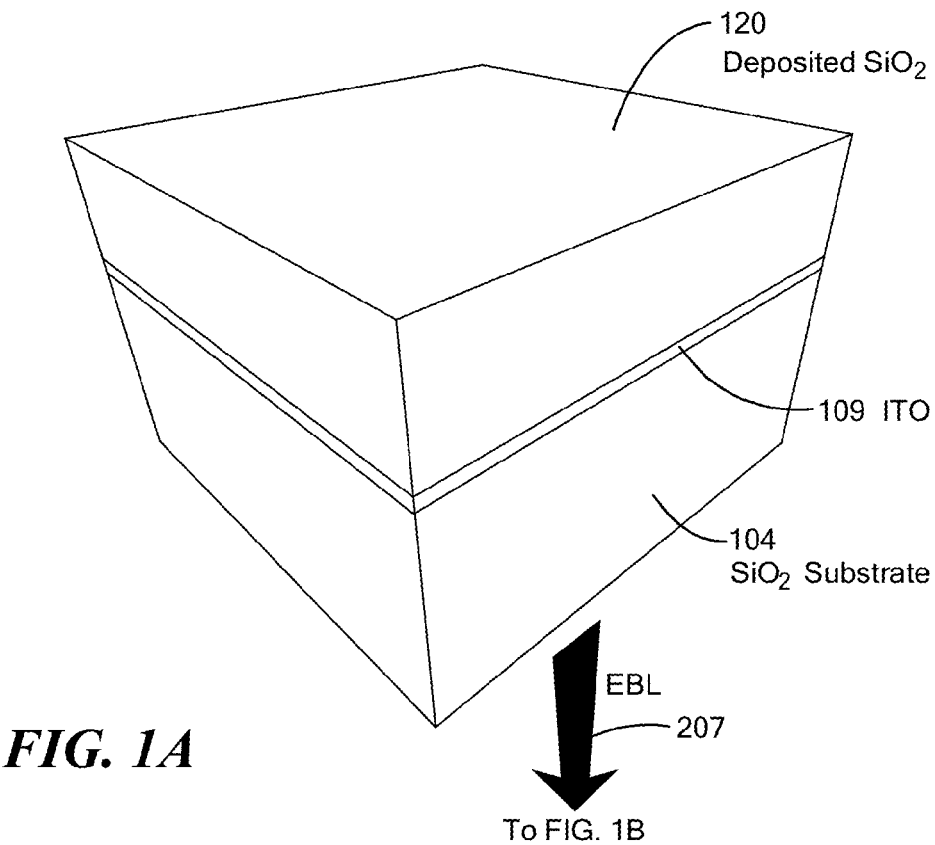
FIGS. 1A-1D depict successive stages in the fabrication of a pillar-supported bowtie nanoantenna (p-BNA) array, in accordance with an embodiment of the present invention.

In accordance with embodiments of the present invention, a new dimension of plasmonic nanotechnology technology is introduced by placing an array of gold BNAs on high-aspect-ratio silicon dioxide pillars, an idea first suggested in applicants' publication in *Nature Communications* on Jul. 14, 2014. As used herein, and in any appended claims, the term "bowtie nanonantenna" (BNA) will be used, without limiting intent, as a heuristic example of the class of nanoantennas generally. Similarly, "pillar-supported bowtie antenna" (p-BNA) will stand for any pillar-supported nanoantenna.

Compared to substrate-bound BNAs, pillar-supported BNAs have been found to exhibit remarkable photo-thermal properties that enable them to record the near-field optical intensity, where the term "near-field" is defined below. A direct consequence is that the plasmonic response of p-BNAs is optically tunable, typically over 100 nm in the visible region, as described in detail below. Moreover, subtle changes in the plasmonic response result in a spatially tunable optical force, again, as described in detail below.

Gold bowtie nanoantenna arrays on glass pillars may advantageously exhibit not only significant field enhancement, but also enhanced sensitivity of thermal properties to input optical intensity. Specifically, examples presented below demonstrate that the radius of curvature of nano triangles that comprise the conductive caps of pillar-supported nanoantennas in the specific case of bowtie nanoantennas can be spatially tuned via local optical-induced heating such that up to 100-nm shifts in the plasmonic resonance response can be obtained. This approach may advantageously result in a photographic film effect, whereby these nanostructures can record the near-field optical intensity at low input power densities in real time, and thus be used to create textured plasmonic surfaces for optical trapping.

Unless defined otherwise, all technical and scientific terms used herein have the same meaning as commonly understood by one of skill in the art to which the disclosure pertains. Although any methods and materials similar to or equivalent to those described herein can be used in the practice or testing of the present disclosure, the preferred methods and materials are described herein.

Definitions

As used in this description and the accompanying claims, the following terms shall have the meanings indicated, unless the context otherwise requires:

The term "image" shall refer to any multidimensional representation, whether in tangible or otherwise perceptible form, or otherwise, whereby a value of some characteristic (amplitude, phase, etc.) is associated with each of a plurality of locations corresponding to dimensional coordinates of an object in physical space, though not necessarily mapped one-to-one thereonto. Thus, for example, the graphic display of the spatial distribution of some field, either scalar or vectorial, such as brightness or color, constitutes an image. So, also, does an array of numbers, such as a 3D holographic dataset, in a computer memory or holographic medium. Similarly, "imaging" refers to the rendering of a stated physical characteristic in terms of one or more images.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. Use of the term "computer process" does not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

As stated above, pillar-supported nanoantennas, generally, may be referred to herein as pillar-supported bowtie nanoantennas (p-BNAs), purely as a heuristic convenience and without intent to limit the particular shape of the nanoantennas to the triangular shape of a bowtie.

The term "near field" (or its adjectival form "near-field") will denote the extension outside a given medium or material of the field existing inside that material, as defined by Girard et al., "*The physics of the near-field,*" Rep. Prog. Phys., vol. 63, pp. 893-938 (2000), which is incorporated herein by reference.

A p-BNA structure in accordance with an embodiment of the present invention is now described with reference to FIGS. 1A-1D, where the p-BNA structure is designated generally by numeral 100. The p-BNA structure 100 consists of one or more arrays of gold nanoantennas 102 fabricated on a substrate 104 so that a segment 106 (otherwise referred to as a "particle" or as a "pad"—OK?) of each nanoantenna 102 caps a pillar 108. For convenience of description, each nanoantenna 102 of a p-BNA structure 100 may be referred to herein as a p-BNA 102, or, synonymously, as a "nanostructure" 102. Also, for heuristic convenience, particle 106 may be referred to herein as a "gold particle," although it is to be understood that other conductive materials may be used, within the scope of the present invention. P-BNA structure 100 may, in some circumstances, be referred to as "p-BNA array" 100, or a "nanoantenna array" 100, though it is to be understood that p-BNA structure 100 may be comprised on multiple subarrays, sharing some, but not all, physical characteristics among the subarrays. In a preferred embodiment of the invention, pillars 108 are silica $SiO_2$ (silica) and advantageously couple intrinsic mechanical and electromagnetic degrees of freedom (DOFs), as will be described. Nanoantenna array 100 may also be referred to herein as a nanoantenna array chip 100 or "chip" 100. Amorphous silica may also be referred to herein as "glass."

In a typical embodiment of the invention, pillars 108 are characterized by a height of about 500 nm, although that measure is provided by way of example only, and without limitation of the scope of the present invention. The aspect ratio of a mechanical member is defined as the ratio of a measure of the length of the member to a measure, such as the width or diameter, characterizing a transverse dimension of the member. The aspect ratio of pillars 108 is preferably greater than 2, and, to the best of the inventors' knowledge, p-BNAs fabricated in accordance with teachings of the present invention have the highest aspect ratio (4.2) of any elevated structure suggested to date.

In a preferred embodiment of the present invention, substrate 104 is silica, and, insofar as the substrate of the p-BNAs is optically transparent, makes this architecture attractive for sensing and trapping of objects in the visible spectral region, for example, in lab-on-a-chip architectures, as described in Kim 2012.

Previous studies of electron-beam manipulation, such as Zheng 2010 and Zheng et al., "*Electron beam manipulation of nanoparticles,*" Nano Lett., vol. 12, pp. 5644-48 (2012), incorporated herein by reference, have used scanning transmission electron microscopes with electron energies in excess of 100 keV, and experimental demonstrations have been limited to manipulation of gold particles small than 10 nm in diameter. Manipulation of particles an order of magnitude larger in the environment of a scanning electron microscope (SEM) with 10-20 keV energies is enabled by the invention described herein. Furthermore, by characterizing nanoantenna deformation as a function of accelerating voltage and SEM magnification (scan area), repeatable, controlled reconfiguration of a nanoantenna array can be achieved using the mechanical DOF, as further described below.

A novel fabrication technique used to engineer p-BNA arrays in situ with individual gaps 110 (or, where the context warrants, "gap spacings" 110) as small as 5 nm between elements 106 of each nanoantenna 102, is now described with reference to FIGS. 1A-1D and FIG. 2. Fabrication of the p-BNAs involves a combination of electron-beam evaporation (EBL) and reactive-ion etching (RIE) processes. In a first step 201, a layer 120 of silica is deposited by plasma-enhanced chemical vapor deposition (PECVD), or otherwise, onto substrate 104 that has been coated with indium-tin-oxide (ITO) 109, preferably 25-nm-thick. Layer 120 provides material that will become pillars 108. An adhesion layer, typically 5 nm chromium, is evaporated (203) onto layer 120, followed, in step 205, by a conductor (typically, 50 nm gold). The nanoantennas 102 are then patterned 207 using EBL, such as into 425-nm spaced square arrays, as shown in FIG. 1D. A protective layer of nickel is then evaporated (209) to protect the gold conductive layer during the final RIE process 211, where the Ni-coated BNAs serve as a mask that enables the formation of uniform arrays of high-aspect ratio p-BNAs 102 with the height of layer 120, typically 500 nm.

Referring now to FIGS. 3A-3F, illumination of the p-BNAs in an SEM, such as a Hitachi Model S4800, causes the constituent arms 108 of the p-BNAs 102 to coalesce toward one another by means of a gap-directed gradient force induced by the electron beam, as described in Bonakdar et al., "*Optomechanical nanoantenna,*" Opt. Lett., vol. 37, pp. 3258-60 (2012), which is incorporated herein by reference. FIGS. 3A-3C show top views of nanoantenna 102, initially, and after exposure to 9 and 18 seconds e-beam exposure. FIGS. 3D-3F show corresponding 25° tilted views of elements 106 of an individual p-BNA 102 bending in response to a raster-scanned electron beam.

Throughout exposure, relatively constant deformation is observed until the p-BNA gap 110 becomes smaller than ~10 nm, at which point rapid motion of the p-BNA arms towards one another occurs. The resulting structures have ~5-nm gap sizes, although in some cases even smaller gaps have been observed. After illumination, the final position of the p-BNAs remains fixed regardless of the gap size, apparently signifying plastic deformation as a result of interaction with the electron beam. This observation is consistent with previous studies, such as those of Zheng 2010, describing superplastic deformation of nanoscale amorphous silica structures under electron-beam illumination. Zheng 2010 describes a 'bond-switching' mechanism, whereby broken or dangling bonds between oxygen and silicon atoms in amorphous silica particles and nanowire structures can reform with nearby atoms, thereby giving rise to migration of defects through the structure. This process can be viewed as a healing mechanism that prevents excessive formation of voids in the $SiO_2$, that is, it mitigates crack formation and increases ductility. Furthermore, illumination with high-energy electrons can cleave existing Si—O bonds, and thus electron-beam irradiation facilitates plastic deformation of nanoscale $SiO_2$ structures by promoting the bond-switching mechanism. In the context of the present work, illumination of the p-BNAs with a high-current density electron beam, with 1-nm probe size, can initiate bond-switching in the silica pillars 108 and enable plastic deformation under strong gradient forces.

Plasmon modes excited in nanoscale metallic (and dielectric) particles due to the interaction with a beam of fast-moving electrons have been shown to result in an attractive gradient force towards the beam. This process is highly dependent on the electron-beam impact parameter, defined as the distance between the beam and particle in the directions (typically designated x and y) transverse to the propagation of the electron beam In accordance with embodiments of the present invention, p-BNAs 102 may be controllably manipulated by exposure to an e-beam by virtue of parametrizing the deformation process described above as a function of SEM accelerating voltage ($V_{acc}$) and magnification (M) using real-time video capture of the SEM display. Experience has shown that the size of gap 110 decreases approximately linearly with time for all parameters considered and, therefore, linear fits enable reliable determination of a gap-closing velocity, $v_g$, for p-BNA gaps down to 15 nm.

Figure 4A:
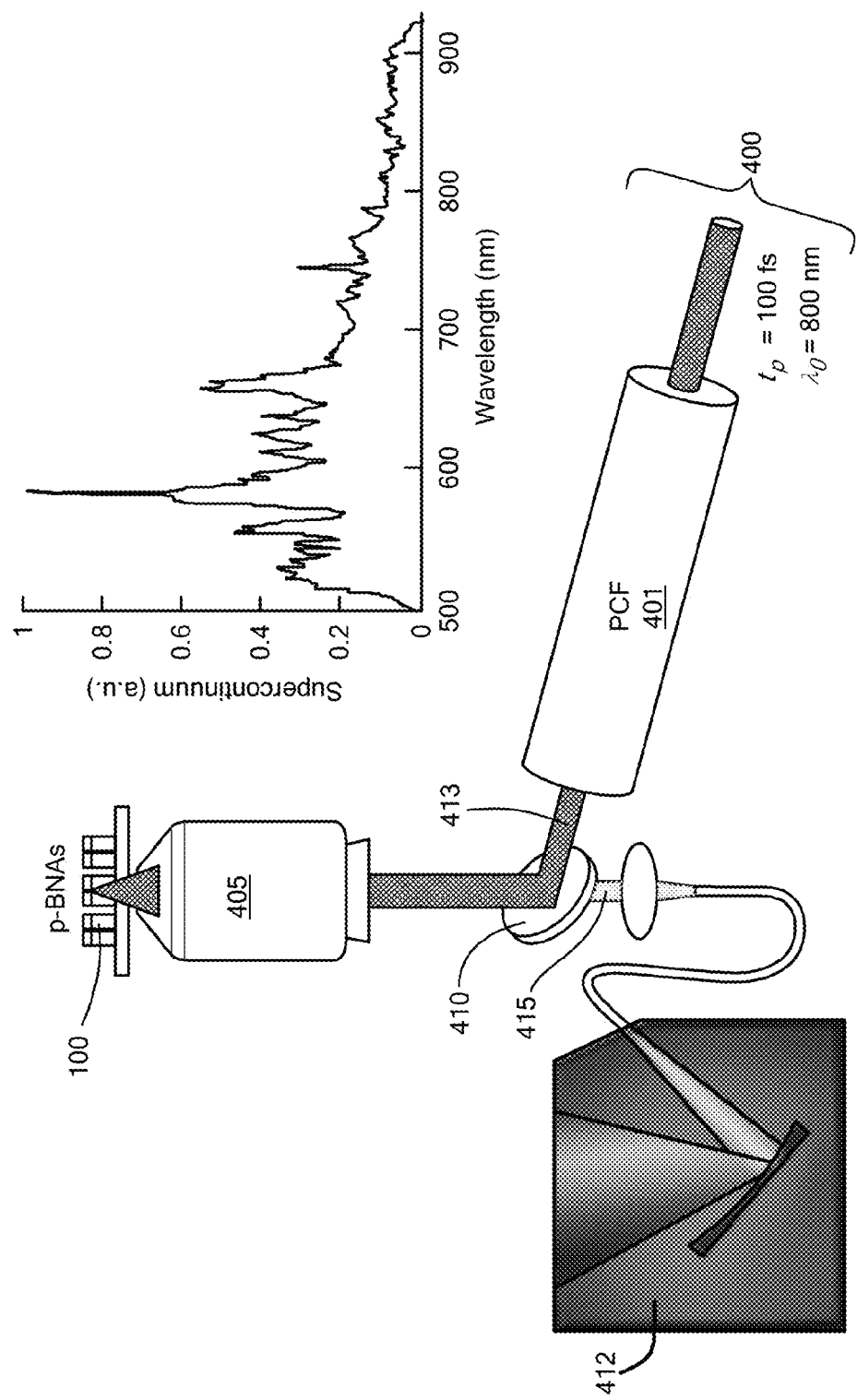

The fabrication process described above may be verified by optical reflection spectroscopic measurements of plasmonic response of the modified p-BNA array 100 as now described with reference to FIGS. 4A-4B. A Ti:sapphire laser-pumped photonic crystal fiber (PCF) 401 produces a substantially spatially coherent, optical supercontinuum beam 403 spanning a spectral range of approximately 500-900 nm that is focused to a diameter of ~3 μm diameter using a 0.6-numerical aperture (NA) microscope objective 405. The pumped PCF constitutes a supercontinuum source, designated generally by numeral 400. Reflection from p-BNA array 100 is coupled, via beam splitter 410, to spectrometer 412, where reflected light 415 is dispersed and analyzed, yielding spectrum 420.

Figure 4B:
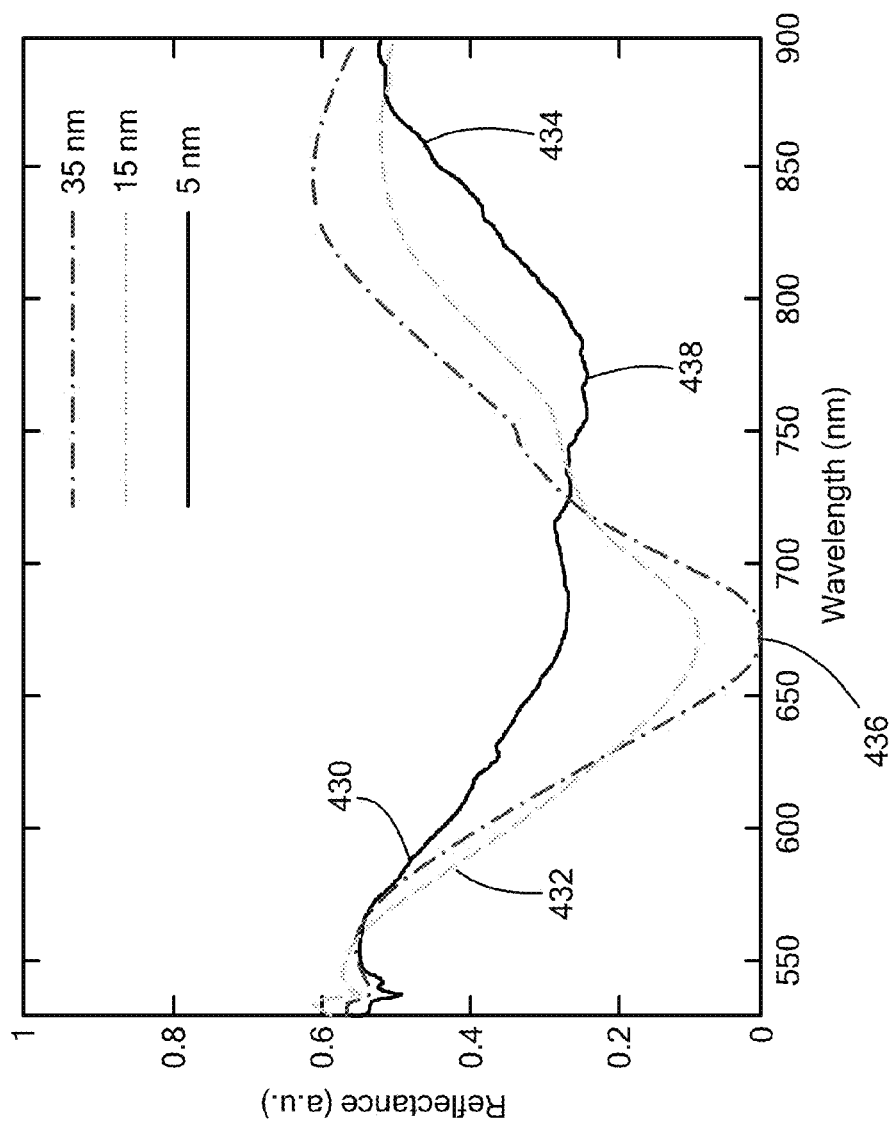
FIG. 4B depicts spectral modification due to e-beam manipulation, in accordance with an embodiment of the present invention.

FIG. 4B shows the normalized reflectance 430 of the nominal (35-nm gap) p-BNAs, as well as spectra for modified 15-nm (curve 432) and 5-nm (curve 434) p-BNA arrays. The nominal array has a peak plasmon resonance 436 at 660 nm, whereas additional red-shifted features 438 appear in the spectra for the smaller gap sizes. These features are a result of both smaller gap sizes and grating modes that exist in the p-BNAs, also known as the Rayleigh anomaly, are attributable to the elevated nature of the structures. However, the sharp spectral features normally associated with these modes are obscured by the fact that the incident illumination comprises many angles ranging from 0 to 36.8° and interacts with a truncated, non-semi-infinite array.

Plasmonic Film

Methods, in accordance with another embodiment of the present invention, are now described in which near-field optical intensity may be recorded using arrays of Au bowtie nanoantennas (BNAs) supported on $SiO_2$ pillars. Methods described herein are applicable not only to plasmon-based data storage but to a multitude of other applications. A p-BNA structure 100 may be referred to herein as "plasmonic film" 100, insofar as it may be used, in accordance with a class of methods described herein, for tuning a localized surface plasmon resonance (LSPR) in the visible spectral region using subtle, photothermally induced morphological changes in structures comprised of pillars 108 and conducting particles 106 (shown in FIG. 1D).

The functionality of plasmonic film 100 is derived from photothermally induced morphological changes in the gold particles 106 (shown in FIG. 1D). Heating of the p-BNAs is generated by focusing a source of light, preferably a CW laser at a wavelength λ of 660 nm, onto the nanostructures 102 with a an objective 405 (shown in FIG. 4A) that is preferably collar adjustable, and is preferably characterized by a numerical aperture (NA) of 0.6, thereby producing which produces an approximately Gaussian intensity distribution with an $e^{-2}$ focal radius of ~670 nm. These characteristics are provided by way of example, and other sources of illumination are within the scope of the present invention. An Olympus LUCplanFLN 40× objective may serve as objective 405. In a preferred embodiment, the laser is polarized along the bowtie tip-to-tip axis 150 (shown in FIG. 1C), which henceforth is referred to as "horizontal polarization."

As the input power is increased from 100 μW (the minimum power required to observe changes in the p-BNAs) to 4 mW, which corresponds to dosages from 0 to 2.8 mW-μm$^{-2}$, the color of the exposed region visibly changes, as now described with reference to FIG. 5. FIG. 5 shows a series of five patches 51 of p-BNAs, each about 10×10 μm in area, that have been exposed by scanning the focused beam over the film in square pattern to increasing doses, namely 0.1, 0.4, 0.7, 1.4 and 2.8 mW-μm$^{-2}$, where the exposure is for a duration (dwell time) of approximately 10 seconds. Given the 670 nm focal spot, this process exposes at most two rows of antennas at a time, which yields an effective pixel size of 850 nm. It should be clear that the intrinsic limit of the current design (namely a 425-nm array spacing) can be easily exceeded by using a higher-NA exposure. Moreover, the minimum pixel size can be further reduced by fabricating a smaller array spacing in the EBL process.

Figure 1B:
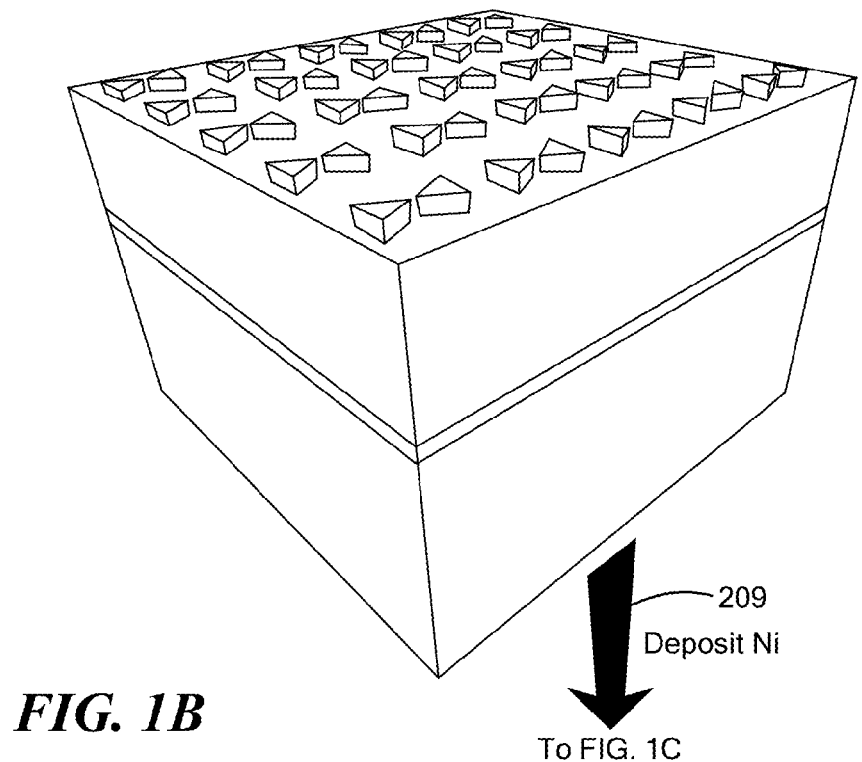
Figure 1C:
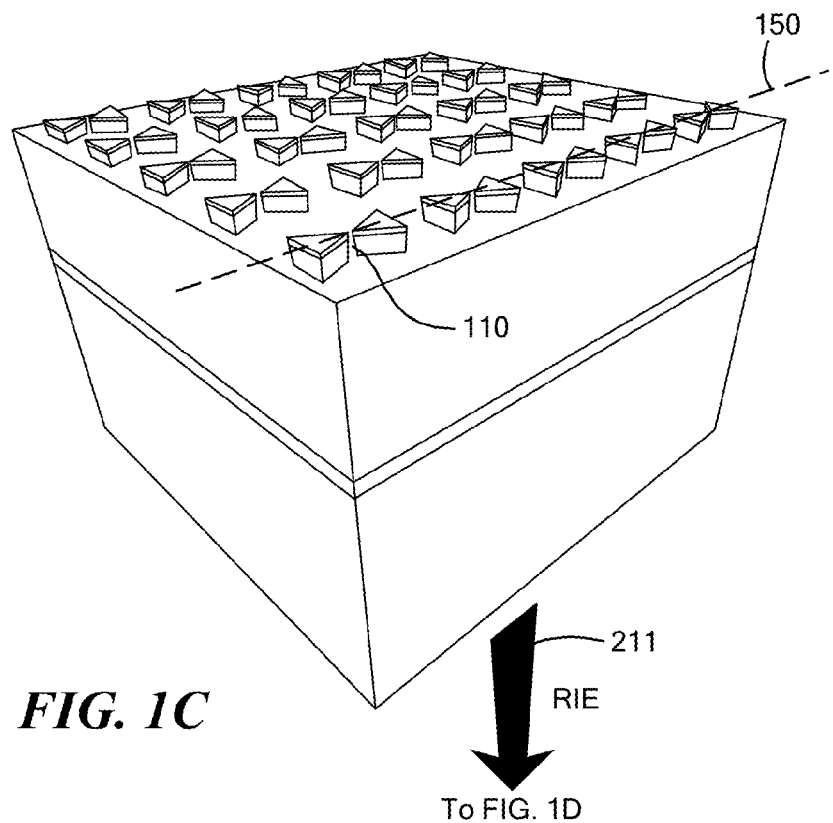
Figure 1D:
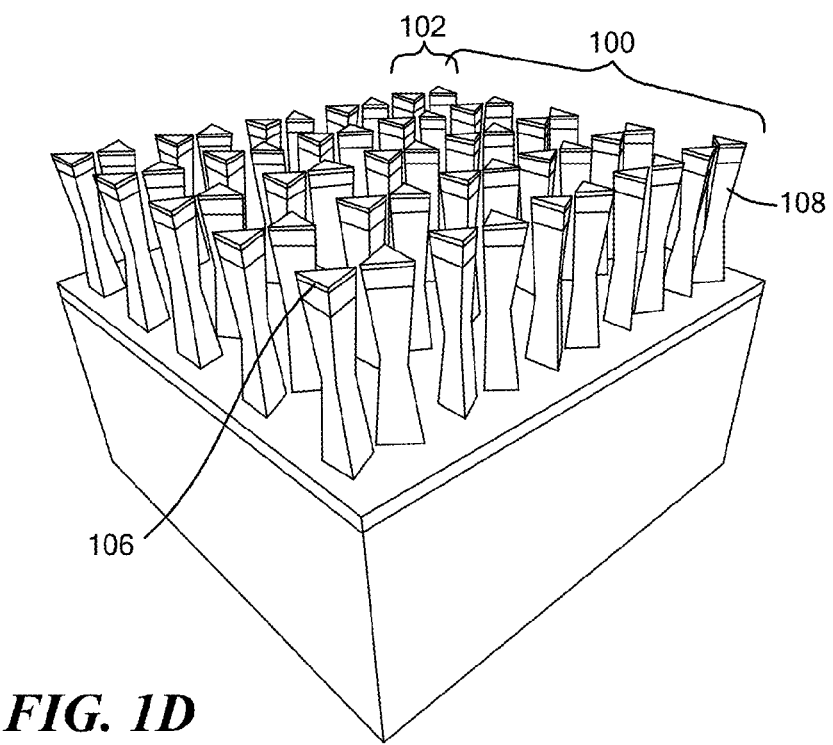
Figure 2:
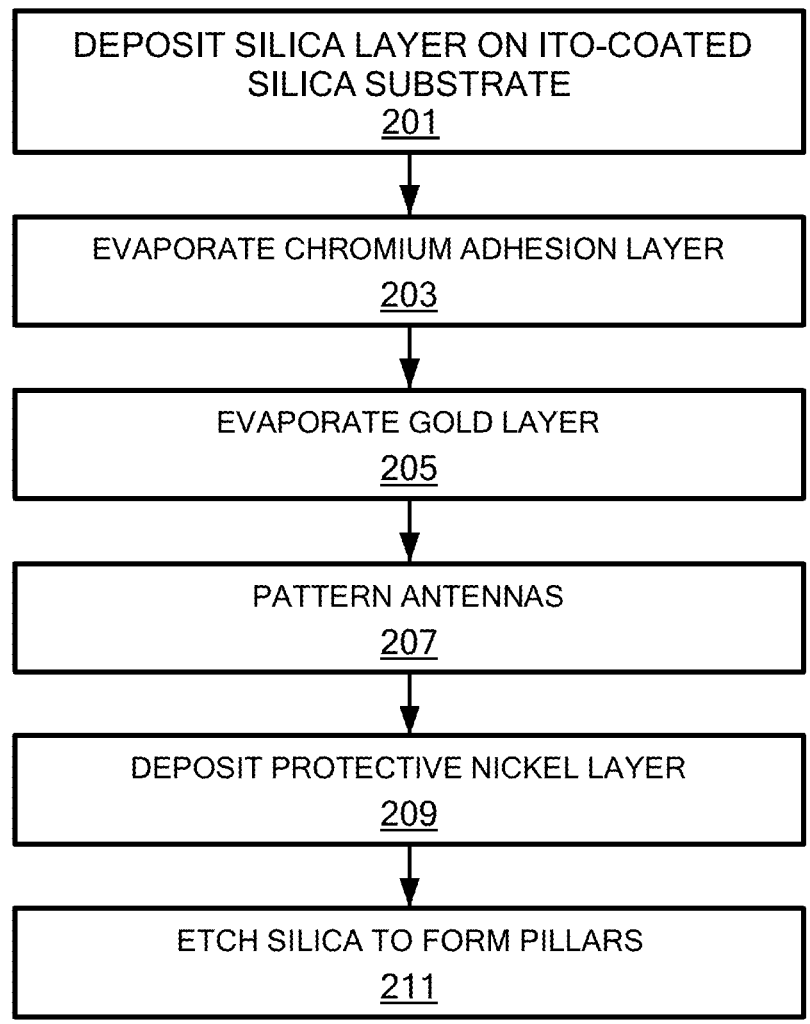
FIG. 2 is a flowchart depicting steps in fabrication of a pillar-bowtie nanoantenna array, in accordance with an embodiment of the present invention.

The resulting color change of the p-BNAs occurs due to the modification of the geometrical parameters of the gold particles 106 including the tip-radius of curvature and triangle height, which in turn modifies the gap size and produces nearly spherical particles at high dosage (FIG. 1b). This process can be understood by examining the temperature profile (T) resulting from thermoplasmonic heating, which was calculated using a COSMOL Multiphysics software package. P-BNA heating is a coupled electromagnetics-heat transfer problem governed by the following system of coupled electromagnetic and heat-transfer equations:

$$\nabla \times (\nabla \times E) - k_0^2 \in E = 0$$

$$\nabla \cdot (-\kappa \nabla T + \rho c_p T u) = q,$$

where E is the electric field, $k_0$, is the wavenumber of the field, $\in$ is the material-dependent relative permittivity, κ is the thermal conductivity, ρ is the material density, $c_p$ is the heat capacity, and u is the velocity distribution of the fluid (namely, air) surrounding the p-BNAs, assumed to be zero. The foregoing equations are coupled by virtue of the fact that the heat power density q is due to ohmic losses, and is given by q=½Re[J·E*], where J is the current density.

Numerical solution subject to periodic boundary conditions (assuming an infinite array) yields the temperature distributions shown in FIG. 6A for an input power of 100 μW and 500 μW (with the latter leading to the temperature in parentheses), corresponding, respectively, to input fluxes of 0.1 and 0.4 mW-μm$^{-2}$. For the pillar-less case of BNA's directly on the substrate, the temperature distribution shown in FIG. 6B is obtained.

To achieve the effect described herein, a thermal conductance of less than 0.1 μW/deg is preferred, where the unit of temperature is degrees centigrade. The thermal conductivity κ of amorphous silica at room temperature is about 1 W-m$^{-1}$-deg C. Thus, the thermal conductance κA/L for a 500-nm silica pillar of aspect ratio 4.2 is 0.03 μW/deg. A simple back-of-the-envelope estimate indicates that a temperature differential of 850° between the elevated nanoantenna pad 106 and the substrate 104 is consistent with a flux of 25 μW along each pillar 108.

It is notable that nanoantennas 102 are heated to over 200° C. with only 100 μW input power. Such large temperatures are attributed to the fact that the Au particles are lifted off the substrate, which normally acts as a heat sink, by a pillar 108 of such low thermal conductance. Thermal conductances less than 0.1 µW/deg are preferred, so that heat conduction away from the conducting nanoantenna pad 106 is significantly reduced. This effect is evident by comparison of FIGS. 6A and 6B, the latter showing the temperature distribution of substrate-bound BNAs excited with 500 µW. Evidently the temperature rise is an order of magnitude smaller when the antennas are attached to the substrate, which signifies the importance of the pillar structure to the functionality of plasmonic film.

Despite significant heating of the p-BNAs, the maximum temperatures in both elevated and substrate-bound cases are significantly below the bulk melting temperature of Au (1067° C.), suggesting that no structural change to the nanoantenna pad 106 will take place. However, it has been shown that surface melting in nanoscale metallic particles, which is enhanced near highly curved regions, can occur at temperatures significantly lower than the bulk melting temperature. As such, the observed increase in tip-radius of curvature from ~15 to 20 nm and reduction of triangle height from ~120 to 115 nm for 100 µW input power is attributed to surface melting. As the input power is increased, the Au temperature exceeds the melting point and the metal is pulled into a spherical shape by surface tension.

Figure 7:
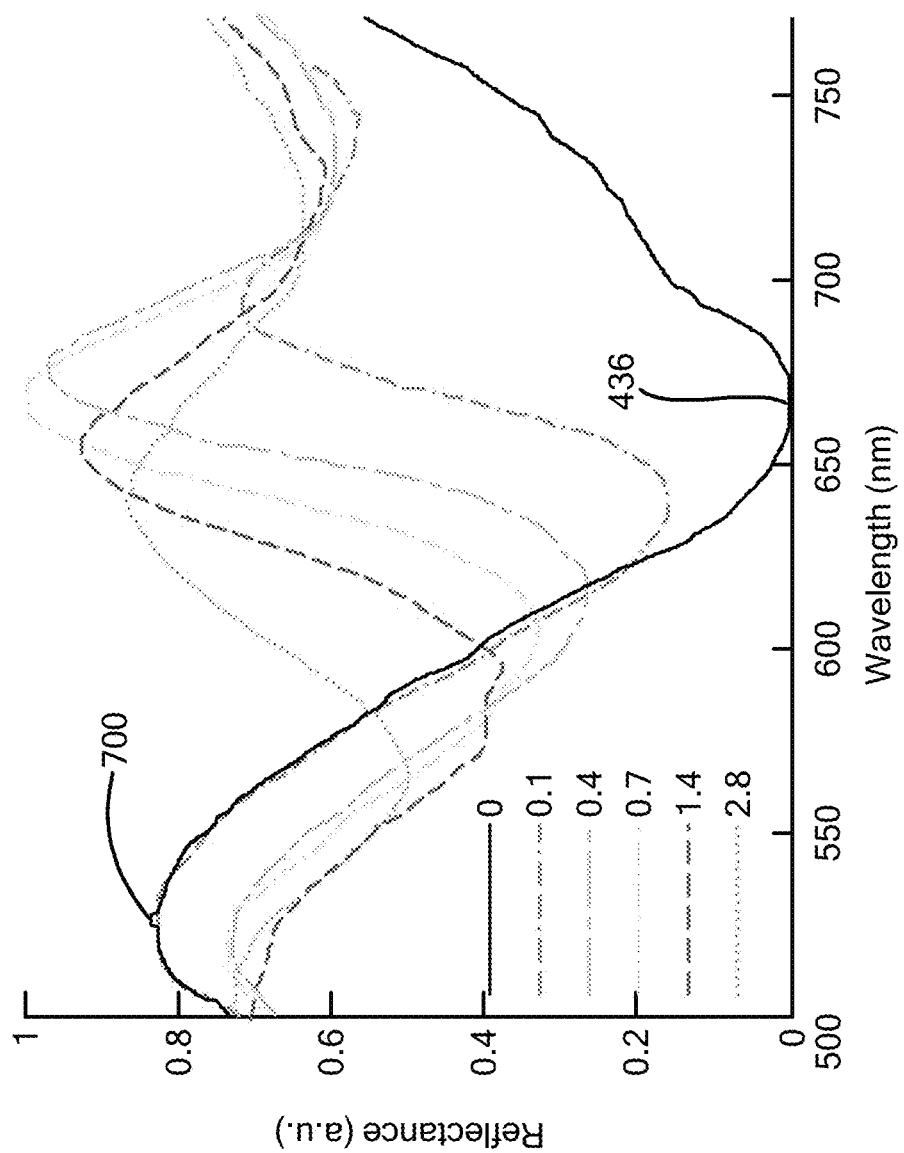
FIG. 7 shows spectral plots of visible reflectance of a nanoantenna array in accordance with an embodiment of the present invention, showing a shifting of the (LSPR) at different levels of incident laser dosage (in mW $\mu$m$^{-2}$).

The visible optical changes evident in the array 100 that are evident in FIG. 5 arise as a direct result of geometric changes in the nanoantennas 102, which, in turn, shift the LSPR peak 436 of the p-BNAs, as shown in FIG. 7. The optical response of each ~10×10 µm patch 51 shown in FIG. 5 is assessed by measuring the spectral reflectance of the light of a focused, spatially coherent, supercontinuum source. The supercontinuum optical source 400 (shown in FIG. 4A) derives from a PCF 401 pumped using a Ti:sapphire laser with 100 fs pulse length, 80 MHz pulse repetition rate, 800 nm center wavelength, and ~200 mW average power. Optical source 400 is coupled into an optical microscope (IX-81, Olympus) equipped with the 0.6 NA objective and spectra 700, shown in FIG. 7, are taken using a fiber-coupled spectrometer 412 (shown in FIG. 4A). As the input laser dosage is increased from 0 to 2.8 mW $\mu m^{-2}$, the main LSPR 436 shifts from 670 to 560 nm as both the bowtie tip-radii of curvature and the gap spacing 110 increase. The result of increased absorption in the green part of the visible spectrum is a striking visual change in the appearance of the nanoantenna array that is evident in FIG. 5. Moreover, a spectral shift of LSPR of approximately 35 nm resulting from a 0.1 mW $\mu m^{-2}$ exposure demonstrates both the high sensitivity of the film and the overall large degree of tunability of the LSPR that is achievable using low input optical power.

In effect, the LSPR shift described above and illustrated in FIG. 7 records the history of the intensity exposure in a manner that is analogous to the chemical changes in silver halide in conventional photographic imaging.

In particular, it is now shown that an array 100 of gold p-BNAs can be used to store optically encoded audio information for subsequent retrieval and playback—a first demonstration of a nonmagnetic, plasmonic nanostructure used for recording audio information. This approach is analogous to the method of "optical sound", which was developed circa 1920s as part of the effort to make "talking" motion pictures. Although there were variations of this process, they all shared the same basic principle. An audio pickup, e.g., a microphone, electrically modulates a lamp source. Variations in the intensity of the light source is encoded on semi-transparent photographic film (e.g., as variation in area) as the film is spatially translated. Decoding this information is achieved by illuminating the film with the same light source and picking up the changes in the light transmission on an optical detector, which in turn may be connected to speakers. In the present instance, the p-BNA array 100 serves the role of the photographic film which can be encoded with audio information via direct laser writing in an optical microscope.

Audio Recording Example

Figure 8:
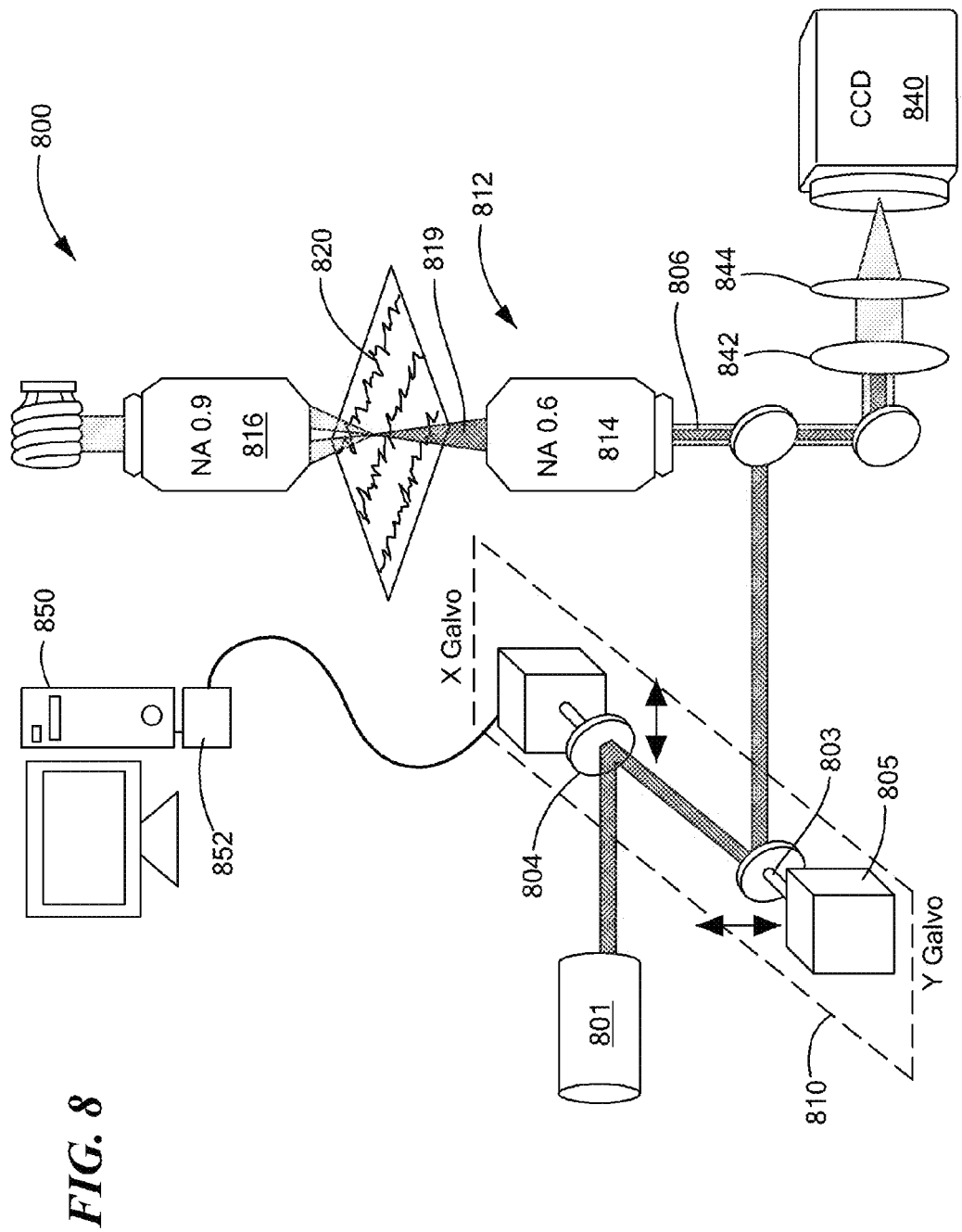
FIG. 8 is a schematic representation of a system for writing and reading an audio recording embodied in a nanoantenna array in accordance with an embodiment of the present invention.

A process of audio recording may be performed by employing a recording apparatus, designated generally by numeral 800, and now described with reference to FIG. 8. A source 801, preferably a tunable Ti:Sapphire laser, is used to produce pulses, which, in a preferred embodiment, have a center wavelength of 780 nm and temporal width of 100 fs. The pulses are polarized along the long axis of the p-BNAs (i.e., in the direction in which nanoantennas 102 have their greatest linear extent). A mirror positioning system 810 includes a pair of beam steerers 803 and 804 that are preferably laser scan mirrors driven by galvanometers 805, however it is to be understood that any beam steering mechanism may be employed within the scope of the present invention. Beam steerers 803 serve spatio-temporally modulate the laser beam 806 used to record an audio file on the plasmonic film 820 (which may also be referred to herein as the "sample").

Mirror positioning system 810 directs optical pulses into a microscope system 812 for optical beam steering. In an upright orientation, the p-BNAs are illuminated from the side of substrate 104. The audio recording and retrieval system are preferably built around a customized inverted microscope (such as Olympus Model IX81) with a collar-adjustable microscope objective 814 (Olympus LUCPlan-FLN 403) of 0.6 NA, which produces an approximately Gaussian intensity distribution with a full width at half maximum (FWHM) of 790 nm. On the other side of the sample 820, a 0.9 NA microscope objective 816 (Olympus MPlan LFN 1003) is used for dark-field imaging. A white light source 830, such as a halogen lamp, is used to image the p-BNAs onto a camera 840, such as a CMOS color camera, preceded by a laser-blocking band-pass filter 842 and lens 844.

In one example, an 80,380-mm² area of plasmonic film 820 includes an array of 4253 425-nm-spaced p-BNAs that are fabricated on top of a 25-nm thick ITO layer and a 400-mm thick $SiO_2$ substrate shown in FIG. 1D. Gold BNAs 102 are sandwiched between an 8-nm thick Ni protective top layer and a 5-nm thick Cr adhesion bottom layer. The fabricated p-BNAs have, on average, a 35-nm gap spacing 110 and pillars 108 with a height of 500 nm. The p-BNAs are illuminated off-resonance at a wavelength of 780 nm. As discussed above, the functionality of plasmonic film 820 for audio recording is derived from photothermally induced morphological changes in the Au particles. In order to observe visible changes with high contrast, 50 mW average optical power is preferred. The optical response of the unexposed and exposed region of the film may be assessed by measuring the spectral reflectance, as described above with reference to FIG. 4A. A 60-nm spectral shift has been observed for the exposed area relative to the unexposed area.

Galvo operation for audio recording is governed by galvo driver 852, which controls the position of mirrors 803, 804. An audio signal stored in a computer 850 is converted to an amplitude-varying voltage that drives the waveform, and the number of points required to record the audio is determined. Given the 0.6 NA illumination objective 814, and the mechanical resolution of the galvo scan angle (14 mrad, in one embodiment), the distance between the sampling points on the plasmonic film 820 determined, 45 nm in one example. The normalized amplitude of the recorded audio is set as 6.5 mm, for example. By transferring the audio information into voltages, waveform recording is enabled by laterally scanning a spot formed by laser beam 819 on the plasmonic film 820.

Dark-field imaging is used to record the image of the written waveform on the plasmonic film. In principle, bright-field imaging can also be used, but dark-field imaging provides high contrast images that facilitate post processing. An RGB image is recorded by the color camera with the image background in red and the 790-nm thick waveform in green. In the audio retrieving process, only the green element value is extracted from the RGB image. Note that a gradual color change in image pixels from green to red is observed at the edge of the waveform. However, through a standard edge-detection approach, a single value can be determined for each lateral position.

Figures 9A, 9B:
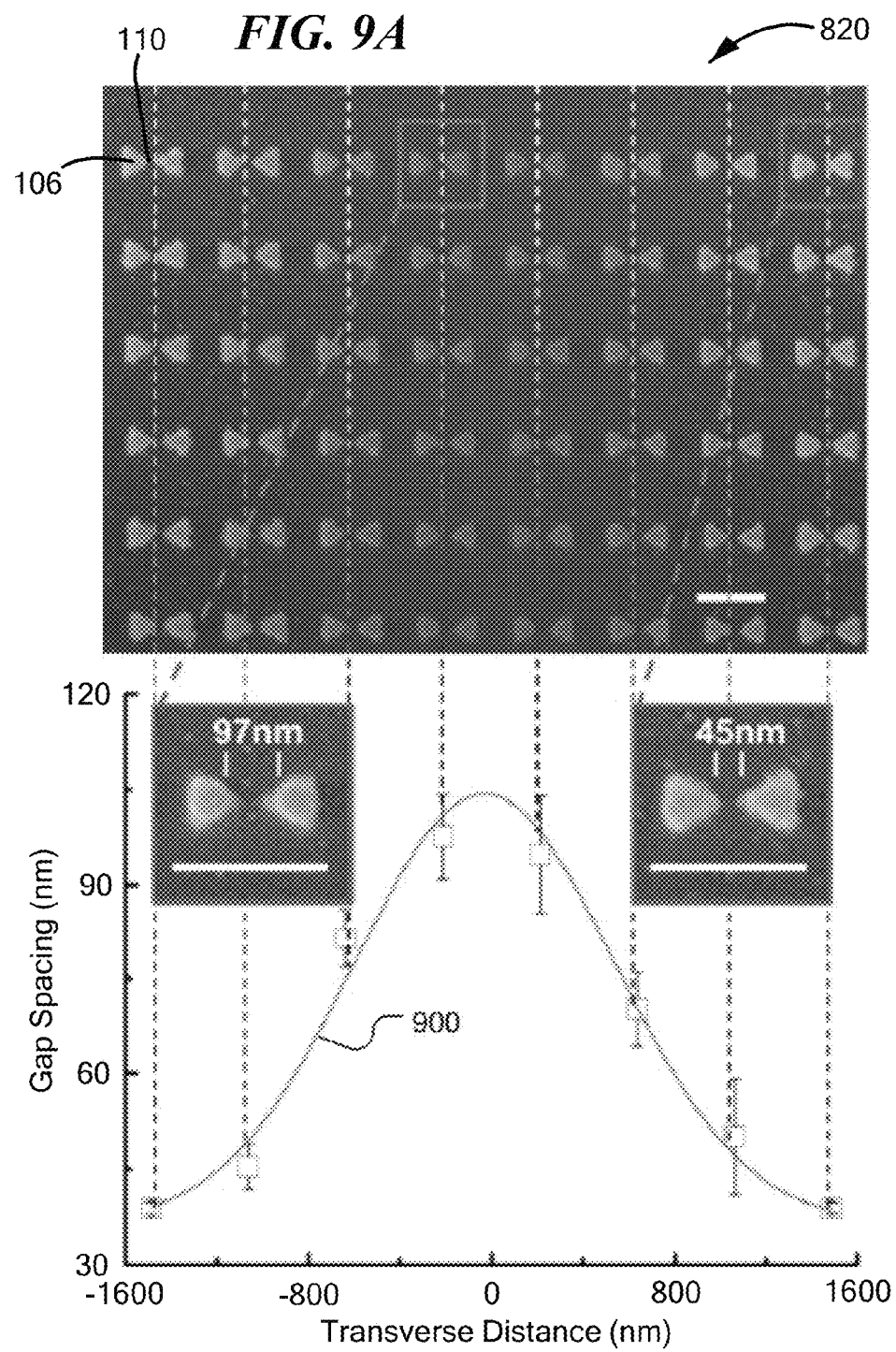
FIG. 9A shows a top view of SEM images of an area of the p-BNAs written with a Gaussian beam (shown in red over the SEM).
FIG. 9B shows a line plot of the change in gap spacing versus transverse position along the Gaussian beam shown in the SEM in FIG. 9A. Insets from left to right are zoomed-in SEM images for two representative p-BNA pairs located at the center and edge, respectively. The scale bar represents 300 nm.
Figure 9C:
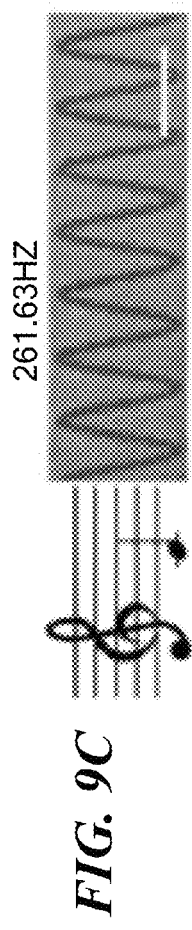
FIG. 9C is an audio signal encoded in plasmonic film.

FIG. 9A provides a top view, scanning electron microscopy (SEM) image of the plasmonic film 820 after a vertical-line illumination pattern (overlayed in red on the SEM). Visible morphological changes of the radius of curvature of each Au triangular tip 106, which, in turn, modifies the gap size 110, are observed. Not surprisingly, the gradual shape change along the horizontal direction in the image is indicative of the intensity gradient distribution from a Gaussian beam. This results in a direct color change on the p-BNAs. As shown in FIG. 9B, a line plot 900 of the change in gap size versus transverse distance fits well with an intensity Gaussian profile of a 780-nm wavelength laser beam focused by a 0.6 NA objective. FIG. 9C shows a pure audio tone as recorded on plasmonic film 820. Basic image processing techniques are employed to convert the 2D p-BNA image to a 1D time-varying audio signal.

To evaluate the capacity of the plasmonic film, the area required to store one second of audio information may be estimated. For a standard recording process, the maximum amplitude is set as 13 mm and one second of audio is stored with a length requirement of 1962.2 mm. Therefore, an area of 0.0255 mm² is required on the plasmonic film 820 for one second of audio storage. In comparison with magnetic tape as a standard analog data storage medium, an area of 1143 mm² is needed to store a one second audio signal. Thus, in the current form, the capacity of a unit area for plasmonic film is 5600 times larger than the conventional magnetic tape.

Figure 9E:
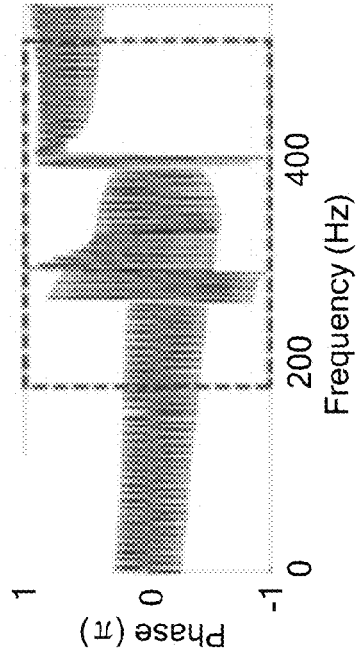
FIGS. 9D and 9E are spectra of amplitude and phase of a recorded signal, ahile
Figure 9G:
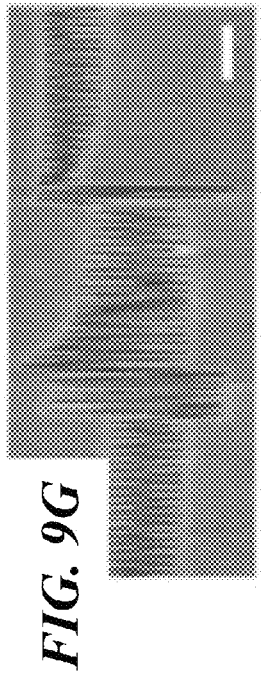
FIGS. 9F and 9G are the spectra as encoded in plasmonic film in accordance with an embodiment of the present invention.
Figure 9D:
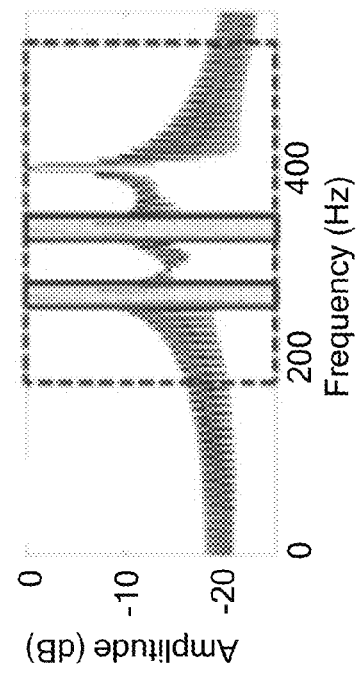
Figure 9F:
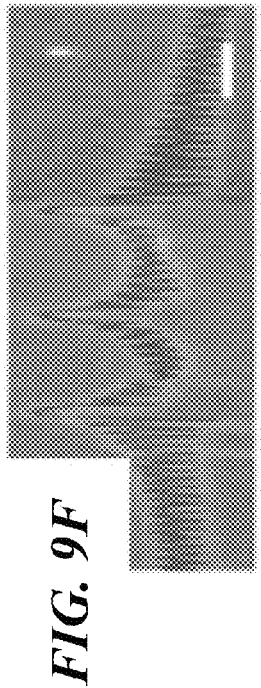

Aside from the recording of a time-varying audio signal, plasmonic film 230 may also be used, within the scope of the present invention, to directly store the spectral information of an audio signal. This is achieved simply by taking the Fourier transform of the original time-domain signal and optically writing the corresponding amplitude and phase spectra on the plasmonic film. For demonstration purposes, a 600-ms duration audio signal was constructed comprising three notes (C4, E and G), and transfer this information into the frequency domain. Each of the notes are equally separated with a duration of 200 ms. FIGS. 9D and 9E are the respective amplitude and phase spectra for the transformed audio, and FIGS. 9F and 9G show how the recorded spectra appear in the plasmonic film 230. The 3 peaks in the amplitude spectrum correspond to the frequencies of the three recorded notes at 261.63 Hz, 329.63 Hz, and 392 Hz. The amplitude value elsewhere is close to zero and thus has negligible contribution to the retrieved signal. To get a better contrast, logarithmic plots of the amplitude spectrum are shown in FIGS. 5H and 5I The retrieved spectra may then be obtained and then inverse Fourier transformed back to the time domain for audio playback.

Given that the spectrum is displayed on the plasmonic film, basic signal processing can be achieved by physically ablating unwanted frequency components on the nanostructure. In this case, a simple filter to block two of the low-frequency components (261.3 Hz and 329.63 Hz,) on the plasmonic film, indicated by the two shaded rectangular regions (each spanning 25 Hz) and physically ablated as shown in FIG. 5J. Note that the sharp edge of the filter is limited by diffraction only. Following the standard audio retrieval procedure, the filtered audio signal is reconstructed, with the value of the signal in the filtered region set to a null. The amplitude for the first 400 ms is close to zero.

Compared with conventional magnetic film for analog data storage, the storage capacity of p-BNAs, in the embodiments described above, is around 5600 times larger. Combined audio and video may also be stored on the p-BNAs, in accordance with the present invention.

Particle Manipulation Example

The large near-field intensity gradients afforded by plasmonic nanotweezers has been an area of increasing interest, especially for those interested in lab-on-a-chip (LOC) devices. Indeed, the attributes of amplified optical forces and flexibility in shaping the optical potential energy landscape are well-suited for trapping nanoparticles, investigating colloidal dynamics, and manipulating biological species. In addition, arrays of Au bowtie nanoantennas (BNAs) may advantageously yield 20× higher optical trapping efficiencies compared to conventional trapping, permitting the use of low-power input power densities. Embodiments of the present invention described above have introduced a new dimension to this technology by placing an array of Au BNAs on high-aspect-ratio silicon dioxide pillars. Compared to substrate-bound BNAs, pillar-supported BNAs (p-BNAs) have highly advantageous photo-thermal properties, as described above.

A plasmonic-based LOC device, as described herein, may advantageously enable "on-demand" user configuration. In this scheme, the user has a standard optical microscope to optically write desired channels into a nanoantenna array "chip" 100 (shown in FIG. 1D), whereby each channel is tuned to trap, isolate, or guide a particular type of particle or cell. A device with such properties enables real-time sorting and isolation of cells, providing new insight into biological function. This is particularly relevant to cancer research where the tumor, a heterogeneous cell mixture, contains cells of a similar sub-type that express different gene and protein signatures, leading to differential cellular structure throughout the tumor. The gold-standard for cell isolation and separation is fluorescence-activated cell sorting (FACS), which, while high-throughput, is expensive due to antibodies and reagents and time consuming due to preparation steps. Magnetic-bead labeling is another antibody-based option, requiring significant handling-time and the magnetic beads can be cytotoxic to cells. Current image-based sorters, such as laser capture micro-dissection, are useful for identifying sub-populations of cells and reducing cell contamination, resulting from non-specific cell isolation, but high-throughput applications are limited.

Thus, plasmonic cell sorting, as described herein, fills the void of these existing technologies by being real-time, label free, and reconfigurable on-demand. In addition, the plasmonic device is characterized by effects in multiple realms of physics, spanning electromagnetics, fluid dynamics, and thermodynamics, thereby presenting an opportunity to expand experiments in colloidal physics and investigate several, not well-understood phenomena such as elucidating the interplay between near-field optical and thermal forces.

Relative to standard approaches that employ optofluidics, a nanoantenna array chip 100 advantageously mitigates the need to fabricate a new, microfluidic structure, based on an a priori design, for each new desired sorting or manipulation task. Rather, researchers may configure the p-BNA template to the desired design using a standard optical microscope and inexpensive laser diodes.

Plasmonic nanotweezers, based on localized surface plasmon resonance (LSPR) excited in metallic nanostructures, continue to attract increased attention due to sub-diffraction-limited spatial confinement of highly enhanced electric fields. This localized field results in a large intensity gradient that results in a greatly enhanced optical trapping force in comparison to that generated in conventional optical tweezers. As an important tool for near field optical manipulation, plasmonic nanotweezers have the potential to be integrated in compact lab-on-a-chip (LOC) systems.

Figure 10:
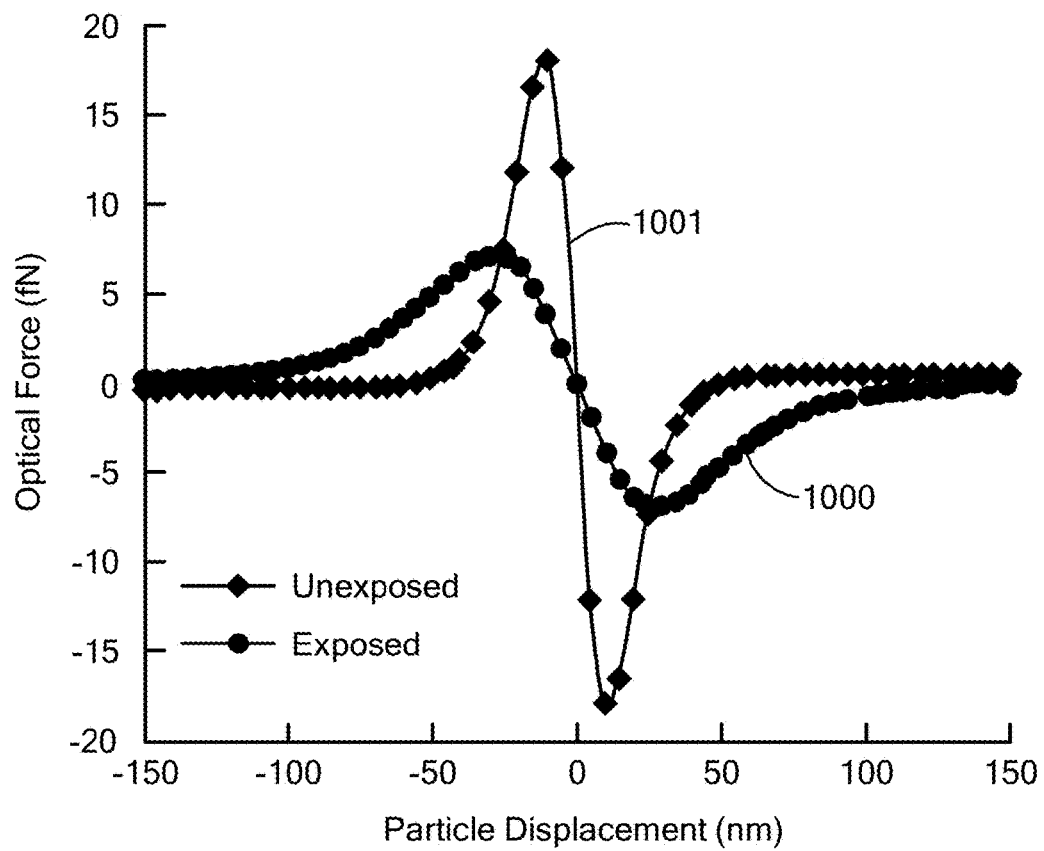
FIG. 10 shows simulations of the Maxwell stress tensor for a 20-nm diameter particle, with unexposed and exposed regions exhibiting different optical forces in accordance with an embodiment of the present invention.

The tunability of the trapping behavior of the p-BNAs enables tailoring of the local potential energy landscape. One attractive application of the plasmonic film platform is optical trapping and guiding in pre-written channels. Mechanistically, this entails preferred trapping in an unexposed film area of the plasmonic film relative to regions that have previously been optically written and have the characteristic of lower trapping force at and further detuned resonance. This interesting effect enables novel functionality compared to other nanotweezer systems, such as the formation of optofluidic channels "without walls." The simulation plot shown in FIG. 10, compare optical forces as a function of particle displacement for exposed 1000 and unexposed 1001 regions of the p-BNAs 100 (shown in FIG. 1D).

As an example of particle trapping in accordance with an embodiment of the present invention, plasmonic film 820 (shown in FIG. 8) was exposed, in an ambient-air environment, using a 1.4 mW $\mu m^{-2}$ dosage with a focused beam to create predefined square-wave trapping channels 1100 with a width of ~5 μm, as shown in FIGS. 11A-11F. A written channel 1102 (comprised of trapping channels 1100) was subsequently immersed in a water-based colloidal suspension of 1-μm diameter $SiO_2$ particles 1105. A portion of the channel 1102 was then illuminated with an approximately collimated 15-μm diameter excitation beam (circle 1110) obtained by focusing the 660-nm, horizontally polarized laser. Particles 1105 were preferentially trapped in the predefined channels 1100. Subsequently, the plasmonic film was moved laterally and the particles were moved toward left. As the cluster of particles 1105 hit an edge 1112 of channel 1102, due to the distributed exposed area on the left, the particles tended to cling to the side of the "wall" and relocate themselves along a vertical segment 1115 of pre-defined channel 1102. After all the particles have been distributed in the vertical segment, the excitation beam 1110 was moved upward to guide the particles to an exit 1117 of the pre-defined channel 1102. Since the cluster of particles 1105 is confined in a narrow channel, some of the particles 1105 are stacked. As a result of unwanted mechanical vibration, a few particles diffused down to the exposed area during the guiding process. However, once these particles settle at the bottom of a channel, they are again dragged back to the channel by the local differences in gradient forces that are responsible for the preferential trapping along unexposed p-BNA channels instead of exposed p-BNA areas.

The viability of trapping 15-um diameter rat macrophages using p-BNAs 100 has been demonstrated. A 525×525-nm array spacing was used, with gap sizes of 40 nm. As shown in FIGS. 12A-12C, these cells 1200 were successfully trapped. Depending on the array spacing used, a power as low as ~1.7 mW was found to be sufficient for trapping. The very low input powers result in considerably less risk of damage to the cells than might otherwise be required for trapping.

Planar Optical Components

Planar optical components are sought for manipulating light while possessing small form factors and light weight, important features to the design of ultra-compact optical systems. State-of-the-art planar optical components typically use diffractive optical elements (DOE). Typically made of mm-thick quartz or plastic, these structures exhibit surface features on the order of the optical wavelength. These surface features that can vary to give an optical field a desired phase profile, e.g., linear, periodic, or quadratic, for beam deflection, diffraction, or focusing, respectively. A challenge with DOE-based optical components is that they cannot be designed for broadband applications. An alternative and emerging technology for fabricating planar optical components employs metasurfaces, which are attractive because of their exquisite control over the optical field. Metasurfaces utilize either dielectric or plasmonic (noble metal) resonators that are subwavelength in dimensions, and dielectric or semiconductor substrates that are hundreds of microns thick or less. The placement of these resonators enables metasurfaces to affect the behavior of an optical field. In addition, resonance also permits frequency tunability, thereby paving the way for achromatic designs. However, moving metasurfaces from basic design to end-user application is non-trivial and slow to adapt to errors or desired changes to functionality that may occur in the intervening steps. Embodiments in accordance with the present invention present plasmon-assisted etching as an approach to fabricating flat optics that mitigates the aforementioned challenges. By operating in the design space between metasurfaces and traditional flat optical components, arrays of Au pillar-supported bowtie nanoantennas are employed as a template for enabling table-top fabrication of planar optical components. Three embodiments, a Fresnel zone plate, diffraction grating, and holographic mode converter, all use the same template. Applications to nanotweezers and fabricating heterogeneous nanoantennas are also shown.

The maker movement has gained momentum in recent years thanks in large part to the reduction in cost of 3-D printers and the concomitant rise of inexpensive, do-it-yourself (DIY) microcontroller boards. A strong theme with this movement is that reducing the number of steps in the manufacturing process, such as the number of steps from original equipment manufacturing to actual end product, may spur learning and innovation and potentially transform existing industries or usher in new ones. This trend has yet to intersect with the rise in nanoengineered surfaces, such as metasurfaces, that can manipulate light. By judiciously tuning the local phase behavior of the constituent nanoantennas, metasurfaces have been shown to refract, diffract, and alter the properties of light with the added advantage of being ultra-thin and lightweight, and possessing small form factors.

In accordance with embodiments of the present invention, described in detail below, arrays of Au pillar-supported bowtie nanoantennas (p-BNAs) 100 (shown in FIG. 1D) can be fabricated once in a cleanroom and subsequently used as a template that enables table-top, post-cleanroom, fabrication of multiple, planar optical components using laser-scanning optical microscopy. That is, this specialized template can be used to short-circuit the fabrication-to-end-component step, obviating the need for in-depth knowledge of the phase-modifying behavior of the constituent nanoparticles. Thus, using p-BNAs, the table-top fabrication of a diffraction grating, Fresnel zone plate, and a holographic mode converter for generating orbital angular momentum—all using the same template—may be demonstrated. To achieve this streamlining in the fabrication process, the subwavelength sculpting of the optical wavefront offered by metasurfaces is sacrificed for one that is diffraction-limited, but which is sufficient for many basic applications. Enhanced local heating from plasmonics can be exploited to enable facile table-top plasmon-assisted etching (PAE) of metal, while offering a thickness on the order of a wavelength (excluding the microns-thick silica substrate) and the spectral-shaping properties of the nanoantennas. This PAE process can be used to tune the radial extent of near-field trapping forces of nanotweezers, and offers a promising route to readily engineering novel nanoantenna arrays that are heterogeneous in both space and material composition.

Plasmon-Assisted Etching

Figure 13:
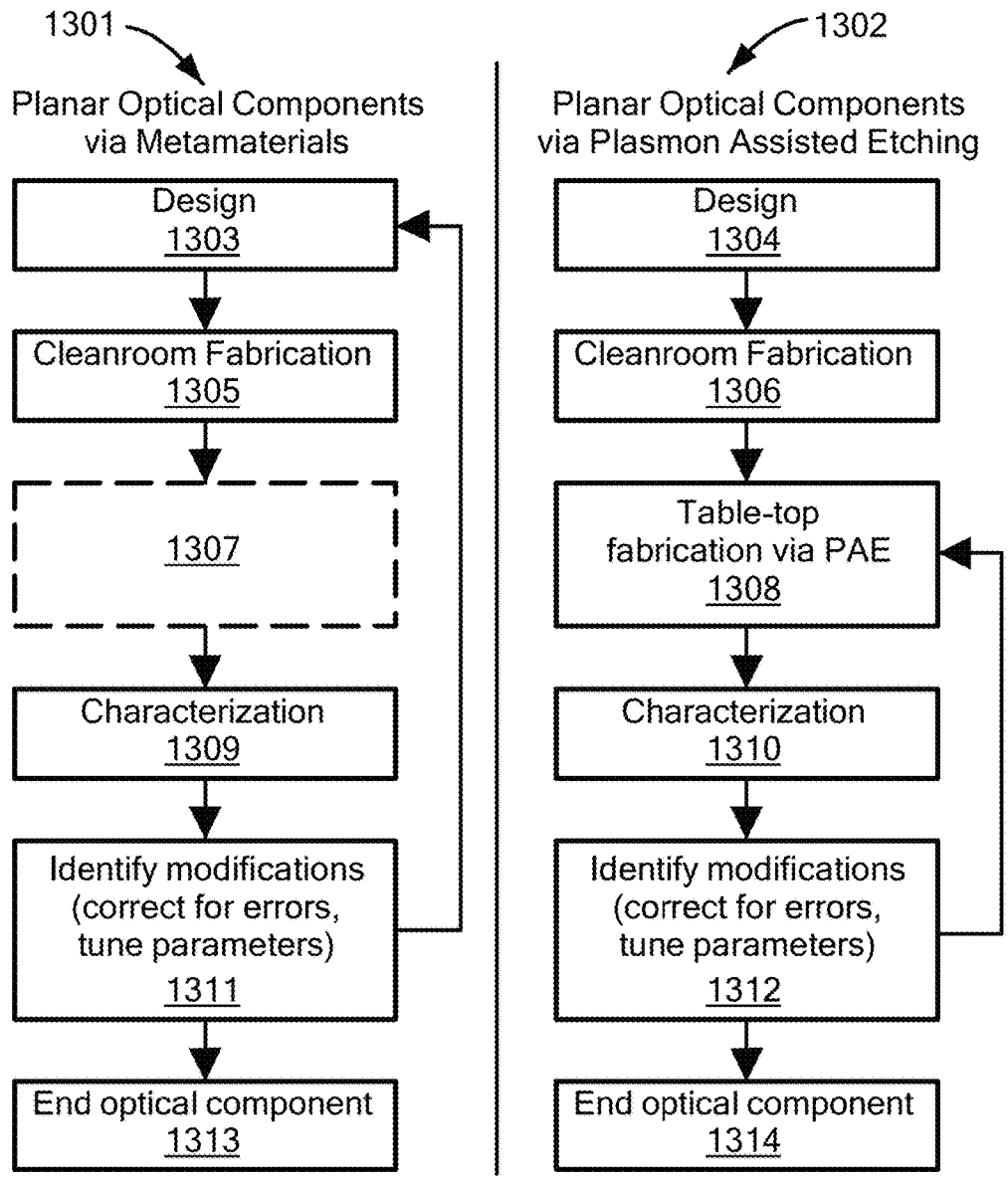
FIG. 13 compares flowcharts of a prior art metamaterial fabrication process and a plasmon-assisted etching process in accordance with an embodiment of the present invention.

PAE, in accordance with embodiments of the present invention, provides a complementary approach to fabricating planar optical components using metamaterials by eliminating the need to go back to the cleanroom and rather instead using one-time fabricated nanoantenna template. A flow diagram comparing PAE approach to a metasurface-based method for fabricating planar optical components is now described with reference to FIG. 13. A metasurface fabrication process, designated generally by numeral 1301 begins at the design stage 1303, whereby a particular arrangement of nanoantennas is computed for a particular target functionality, such as focusing light to a specific distance. The design is then taken for fabrication 1305 in a cleanroom, producing a prototype component 1307, subsequently subject to various characterization experiments 1309. Based on these experiments, modifications and corrections are formulated (in step 1311), resulting in iterative design, fabrication and characterization. The foregoing process may lead to realization of the desired planar optical component 1313. However, if characterization reveals errors in the component, or if a particular parameter needs to be tuned, then the entire process has to begin anew from the basic design stage.

The first step of a PAE process, depicted generally by numeral 1302, is to design a template (in step 1304), which, in a preferred embodiment, is based on the use of Au p-BNAs. The p-BNA template is then fabricated 1306 in the cleanroom. Next, the template is taken to a laser-scanning optical microscope, through which spatially directed pulsed laser illumination is used to debond the Au nanoantennas from their silica pillars in a desired pattern (in step 1308). Any planar pattern of metal may be formed in the manner described herein within the scope of the present invention. The fabricated structure can then be characterized (1310) and tested for errors. If there are errors or a need to change the parameters of the fabricated component, then the process goes back to the table-top fabrication stage 1308. This provides a significant difference compared to the metasurface approach. As a result, PAE offers a more intuitive, fast, and reconfigurable fabrication process with the tradeoff of diffraction-limited shaping of the optical wavefront.

Figure 14A:
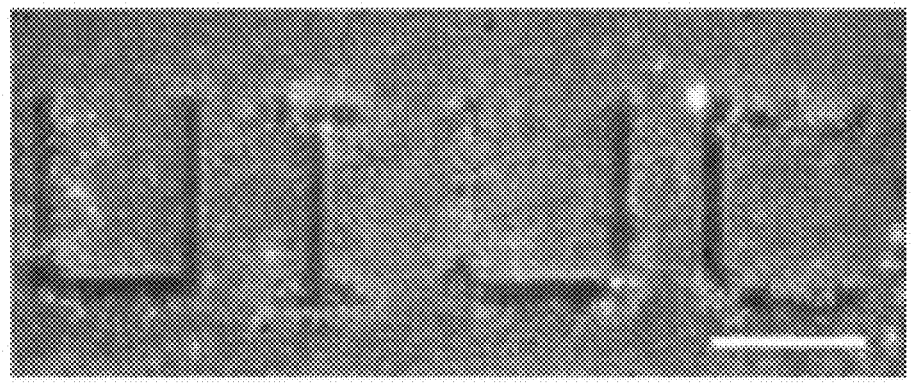
FIG. 14A is a dark-field image of a pattern etched in a p-BNA template using PAE, in accordance with an embodiment of the present invention.
Figure 14B:
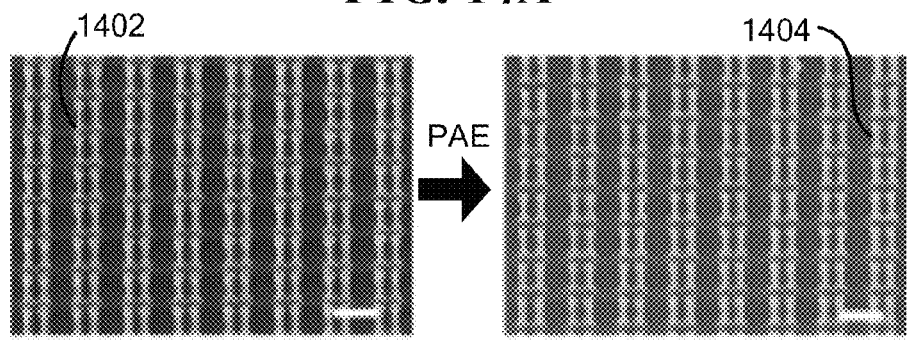
FIG. 14B shows scanning electron micrographs of an unetched region 1402 and a PAE-etched region 1404 of a p-BNA chip.
Figure 14C:
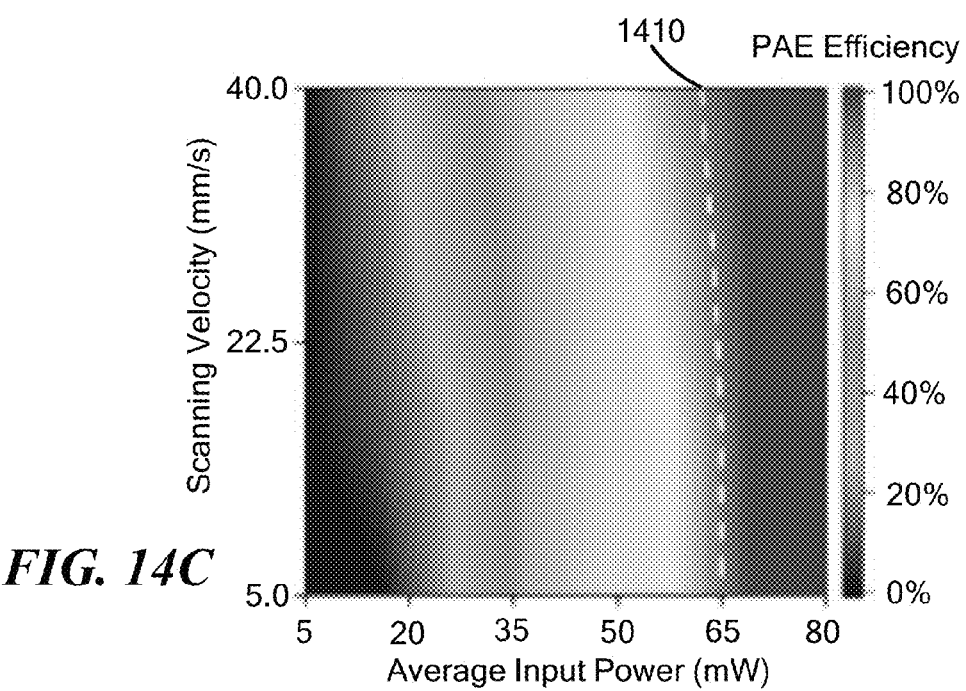
FIG. 14C shows the efficiency of the PAE process as a function of average input power and scanning velocity.

FIGS. 14A-14C provide a closer look at the PAE process. A microscope stage is scanned for fixed focused laser illumination of the p-BNA template, whereby the Au nanoantennas debond from silica only for the illuminated regions. Note that either the beam or a stage retaining the p-BNA template may be scanned in accordance with embodiments of the present invention. This approach is used to etch the initials "UIUC", as observed in the dark-field image shown in FIG. 14A. Scanning electron micrographs (SEMs) of the etched structure are shown in FIG. 14B for both etched 1404 and unetched 1402 regions of the p-BNA chip. From these images it is clear that this process cleanly debonds the metal pads 106 (shown in FIG. 1D), leaving the silica pillars 108 unaffected. To determine the effect of input optical power and scan velocity of the focused laser beam on the PAE process, we independently control these parameters for a fixed p-BNA array area ($10 \times 10$ μm$^2$) and subsequently examine the percentage of metal completely removed in this region. FIG. 14C summarizes the results, where the color used corresponds to the percent efficiency of the process. White dashed line 1410 delineates the threshold at which the PAE efficiency is greater than 90%. PAE process is observed to have a stronger dependence on average input power than scanning velocity. Debonding of the metal for some of the p-BNAs occurs for average input powers as low as 10 mW. However, due to common inhomogeneities resulting from the electron-beam lithography process, e.g., subtle variations in nanoantenna gap size and radius of curvature, an average input power of 65 mW is required to achieve at least 90% PAE efficiency for most of the scanning velocities used.

A straightforward explanation can be used as a first approximation to understanding the PAE process. To begin, the p-BNA structure is immersed in water and illuminated by a focused pulsed laser beam spectrally centered at a wavelength $\lambda=780$ nm. The excitation source is a 100-fs pulsed, 80-MHz repetition rate Ti:sapphire laser focused by a 0.6-numerical aperture (NA) microscope objective. Upon optical illumination the metallic nanoantenna structures begin to generate heat via optical absorption, and the corresponding heat power can be estimated through $$Q = \int_{\lambda_{max}}^{\lambda_{max}} \sigma_{abs}(\lambda) \langle I(\lambda) \rangle d\lambda,$$

where $\sigma_{abs}(\lambda)$ is the spectral absorption cross-section of the metal layer of the illuminated p-BNAs and I is the incident average intensity. Consideration is given to the fact that the thermal conductivity ratio ($k_{Au}/k_{Ti} \approx 14$) between Au and Ti is much smaller than that ($k_{Au}/k_{water} \approx 512$) between Au and the surrounding water, and that the Ti adhesion layer is firmly attached to the gold bowties. In addition, the gold bowties have a significantly larger volume (~10×) and exhibit larger optical absorption, than their Ti adhesion layers. Thus, it is understandable that the heat generated is chiefly provided by the gold bowties and that the temperature increase is uniform within the metal layer.

For pulsed illumination, the temperature increase in the bowties can further be estimated through.

$$\Delta T = \frac{\sigma_{abs} \langle I_0 \rangle}{V \rho_{Au} c_{Au} f},$$

where V is the bowtie volume (0.0011 μm$^3$), $\rho_{Au}$ is the density of gold (19320 kg/m$^3$), $c_{Au}$ is the heat capacity of gold (129 J/kg/K), and f is the pulse repetition rate. This results in an absorption cross-section of 0.065 μm$^2$ for arrays of 425-nm spacing. As a result of the heat generated from this optical absorption, both the metal nanoantennas and the SiO$_2$ pillar at the interface undergo thermal expansion albeit with different thermal expansion coefficients. This effect leads to the generation of mechanical stress at the interface, which in turn serves as a driving force for triggering interfacial debonding. Consequently, strain energy is stored within the deformation of the metal layer and can be estimated to be $$U_{strain} = E_{metal} \times [(\alpha_{metal} - \alpha_{SiO_2}) \times \Delta T]^2 \times t_{metal},$$

where $E_{metal}$ is the Young's modulus of the metal, $\alpha$ is the coefficient of linear thermal expansion, $\Delta T$ is the temperature increase and $t_{metal}$ is the thickness of the metal. For input powers near 90 mW, the metallic bowtie temperature can easily approach the melting point of bulk Au (~1064° C.) where surface melting near highly curved regions already happens, and the corresponding strain energy is around 0.81 J/m².

In addition to optical illumination, the water ambient also plays an important role in the debonding process. Previous studies have shown that the metal-$SiO_2$ interface in water can result in facile debonding of metal film from a $SiO_2$ substrate due to the fact that water has a strong polar interaction with the strained Si—O—Si crack-tip bonds. In the context of the present invention, a Ti—O—Si bond is believed to form during the e-beam deposition of the Ti adhesion layer. During the PAE process, the aforementioned strain energy builds up in the metal layer of only the illuminated p-BNAs deforms the Ti—O—Si crack-tip bond, which readily reacts with water molecules to form Ti—O—H and Si—O—H on each side of the separated interfaces. This mechanism has been referred to as water-assisted subcritical debonding, where the presence of water greatly reduces the critical adhesion energy of the metal-$SiO_2$ interface; this effect has been used in applications such as the peel-and-stick process. Moreover, interfacial energy difference before and after debonding was examined to investigate whether debonding of the p-BNA structure in water is spontaneous.

The interfacial energy between two substances is governed by Dupre's equation which is expressed as:

$$\gamma_{12} = \gamma_1 + \gamma_2 - W_{ad},$$

where $\gamma_{12}$ is the interfacial energy, $\gamma_1$ is the surface energy of one material, $\gamma_2$ is the surface energy of the other material and $W_{ad}$ is the work of adhesion for the interface. Before debonding, the energy of the system is simply the interfacial energy at Ti—$SiO_2$ interface and after debonding the energy of the system includes the interfacial energies at Ti—$H_2O$ interface and $SiO_2$—$H_2O$ interface.

One may define the amount the system energy goes down by after debonding as $$\Delta\gamma = \gamma_{Ti-H_2O} + \gamma_{SiO_2-H_2O} - \gamma_{Ti-SiO_2}.$$

The calculated interfacial energy for a Ti—$SiO_2$ interface is ~2.9 J/m²; for the Ti—$H_2O$ interface and $SiO_2$—$H_2O$ interface, $\gamma_{Ti-H_2O}$ is ~2.0 J/m² and $\gamma_{SiO_2-H_2O}$ is ~2.7 J/m². Note that all those values are estimated under room temperature. Thus, after debonding, the system energy goes down by a positive amount of energy, in other words, the debonding at the metal-$SiO_2$ interface is energetically favored and should happen spontaneously even at room temperature. However, according to experimental observation, the debonding between metallic bowties and $SiO_2$ pillars occurs under no circumstances when optical illumination is absent. Some transition state that exists from pre-debonding to post-debonding state is expected, which acts as the energy barrier that prevents spontaneous debonding in water under room temperature. To further elucidate this process, one must look at the kinetics.

Previous studies have shown that models for chemical reaction processes in bulk materials can be used to describe debonding behavior of interfaces where similar chemical reaction kinetics may occur. Standard transition state theory describes a hypothetical transition state that exists between reactants and products during a chemical reaction. For a single-step reaction, the reaction rate can be expressed by Eyring-Polanyi equation:

$$k = A \frac{k_B T}{h} e^{-\frac{\Delta G^\dagger}{RT}}$$

In the equation above, k is the chemical reaction rate, A is a constant related to the concentration of reactants, $k_B$ is the Boltzmann constant, $\Delta G^\dagger$ is the Gibbs energy of activation, R is the gas constant, h is Planck's constant, and T is the temperature. In the context of the present work, the kinetics of the p-BNA debonding in water ambient can be approximated by:

$$\eta A + B \rightarrow B^*$$

where B represents an unbroken bond at the debonding front, $\eta$ is the number of reactive species A, which is water in this work, associated with the bond rupture process, and B* represents the activated complex of transition state that forms during the reaction and subsequently decomposes to a broken bond and species A left associated with the broken bond. Based on this assumption it can be shown that the kinetics during debonding process can be described by the net debonding velocity:

$$v_c = v_0 \cdot a_x \left\{ \exp\left[-\frac{U_+(G)}{kT}\right] - \exp\left[-\frac{U_-(G)}{kT}\right] \right\},$$

where $v_0$ is the lattice vibration frequency (~kT/h), $a_x$ is the distance which the debonding advances by one atomic spacing, T is the absolute temperature, k is the Boltzmann's constant, and $U_+(G)$ and $U_-(G)$ correspond to the activation energy for bond rupture and intrinsic restoration strength of bond itself, respectively.

Under the illumination of a focused laser beam, the kinetics of the p-BNA debonding rate can be reduced to the following:

$$v_c = v_0 \cdot a_x \cdot \exp\left[-\frac{2 \cdot \gamma'_{tz}}{\pi N_B kT}\right] \cdot \exp\left[-\frac{G - N_B(\mu_{B^*} - \mu_B - \eta \cdot \mu_A^s - \eta kT \ln(a_A))}{2 N_B kT}\right],$$

where $N_B$, is the areal density of bonds along the debonding interface, G is the driving force for debonding, $\mu_{B^*}$ & $\mu_B$ are chemical potentials of the broken and unbroken bonds, $\mu_A^s$ is the chemical potential of species A in its standard state, $a_A$ is the activity of species A, and $\gamma'_{tz}$ is an energy term associated with the lattice trapping range. This debonding equation can be seen as a balance between the driving force that triggers and accelerates debonding and the energy necessary to initiate the interface separation. When the strain energy in the metal layers increases to a point where it overwhelms the required activation energy, the hindered debonding of the metallic bowties off the $SiO_2$ pillars occurs. Thus it is clear that the collaboration between optically induced strain energy due to illumination and reduced adhesion energy resulting from the presence of water, contributes to overcoming the energy barrier and initiating the observed PAE effect.

Using PAE to Fabricate Basic Planar Optical Components

Figures 15A, 15B, 15C:
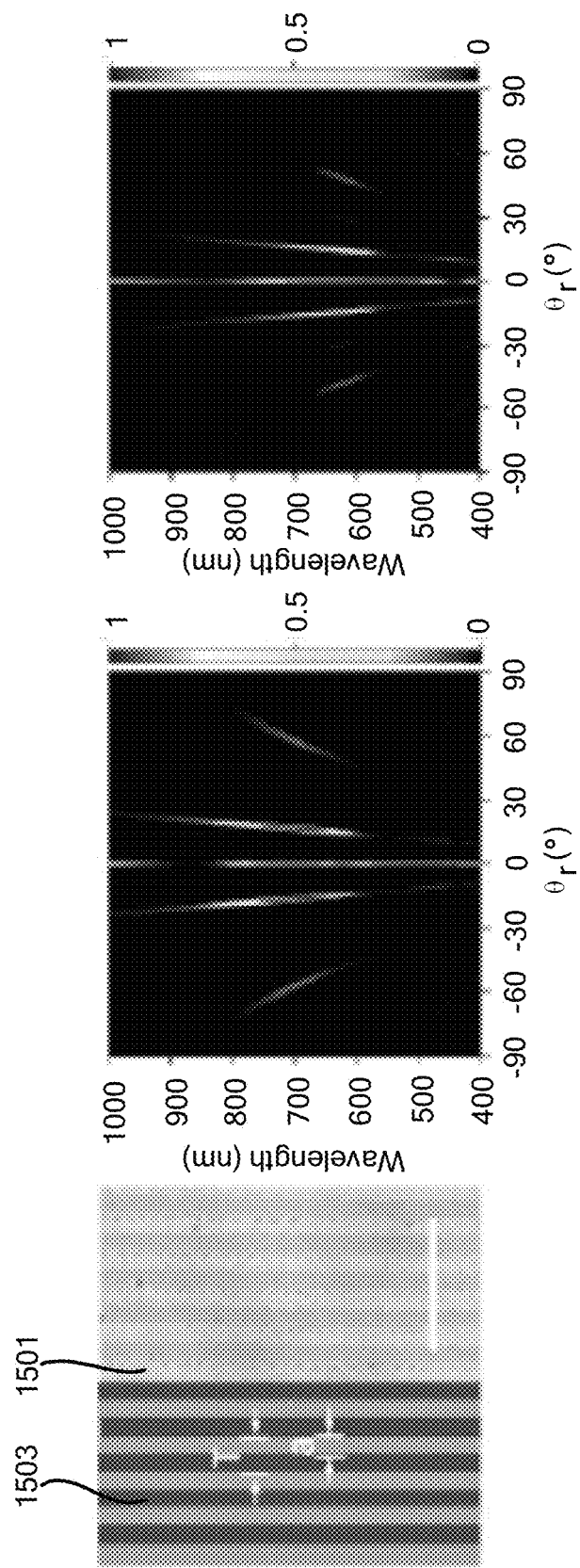
FIGS. 15A-15G depict PAE-fabrication of a planar diffraction grating, in accordance with an embodiment of the present invention.
Figure 15D:
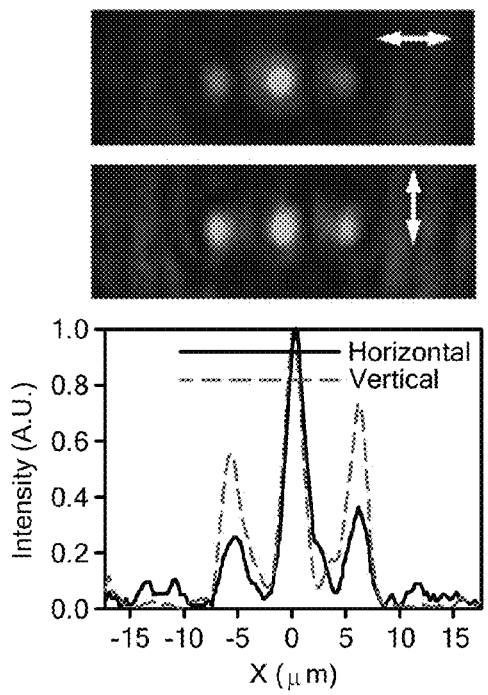
Figure 15E:
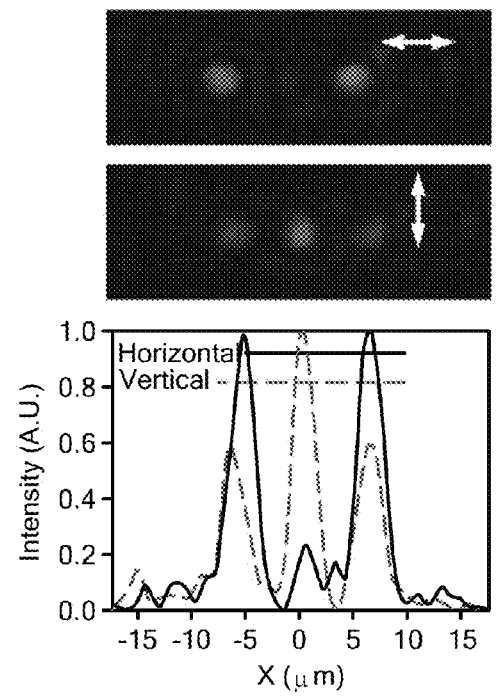
Figure 15F:
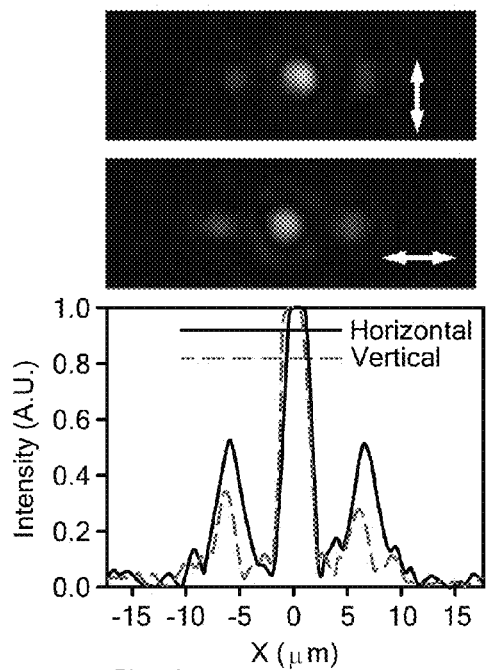
Figure 15G:
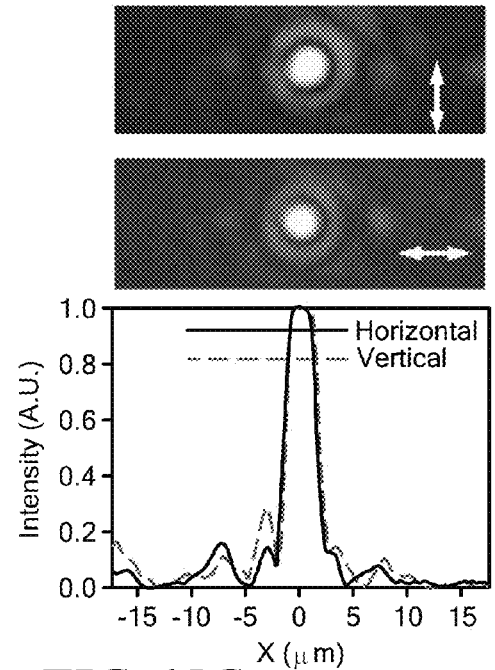

FIG. 15A shows a diffraction grating 1501 fabricated using PAE, in accordance with an embodiment of the present invention. An overlaid schematic of the grating structure 1503 notes relevant parameters. Diffraction grating 1501 is characterized by a period T of 10 μm and duty cycle of 50%. The yellow regions of the grating are the etched areas, displaying the color of the glass substrate, while the unetched areas exhibit a green hue due to the gold antennas. To estimate the performance of the grating, finite-difference time-domain (FDTD) simulations were employed to numerically solve for the normalized reflected intensity as a function of input wavelength λ and diffraction angle $\theta_r$, when the grating is illuminated by normally incident light for either the x-(along the long bowtie axis) or y-(orthogonal to the long bowtie axis) polarization direction. It is found that due to the plasmonic response of the structure, the grating effect emerges in the wavelength range of ~600-800 nm for x-polarization and ~500-620 nm for y-polarization, whereby approximately 60% and 35% of the incident light is reflected at resonance, respectively. Within these bands of wavelengths, light is reflected back periodically at the surface of the p-BNA chip making the component work as an amplitude grating. Outside the active wavelength regions, the diffraction grating behaves as a normal silica glass showing no diffraction. Thus, this type of structure can be used to route selected wavelengths, while leaving light at other wavelengths unaltered, particularly for applications related to ultracompact optical systems where frequency demultiplexing is important. The experimentally measured diffraction patterns and associated cross-sectional intensity distributions are shown in FIGS. 15D-15G for laser wavelengths of 543, 660, 685 and 785 nm. At 660 nm, 65% of the light is concentrated into the $1^{st}$-diffracted order for the x-polarization, thereby behaving more like a blazed grating. In contrast, at 785 nm, most of the energy remains in the $0^{th}$-order.

Figure 16A:
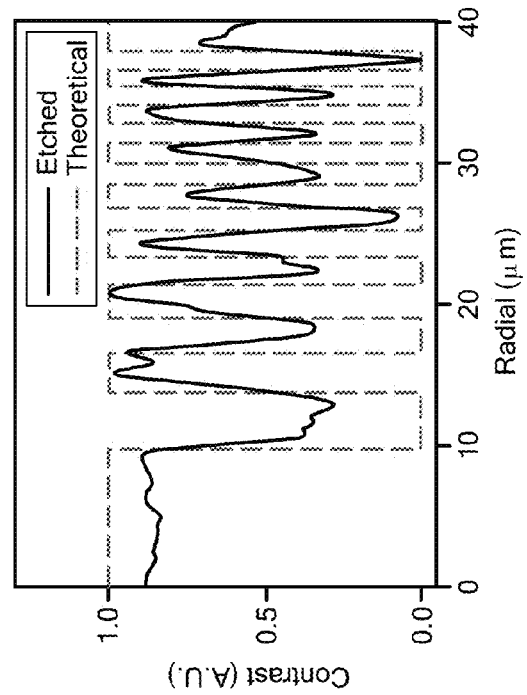
FIG. 16A depicts a bright-field image of a PAE-fabricated planar Fresnel zone plate with an overlaid schematic of a theoretical design in accordance with an embodiment of the present invention. The scale bar represents 10 μm.
Figure 16B:
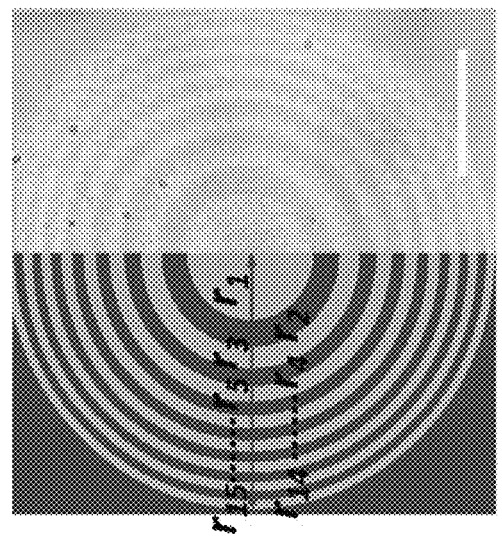
FIG. 16B compares theoretical and experimental contrast along the radial direction

In addition, it is also possible to use PAE to fabricate a Fresnel zone plate (FZP), as shown in FIG. 16A, where the left half is the schematic 1602 and the right half is a bright-field image of the actual fabricated pattern 1604. The 80×80-μm² area of a p-BNA chip 100 is divided into 15 alternating concentric circles of etched and unetched regions. The width of each Fresnel zone is governed by the equation: $r_n = \sqrt{n\lambda f + n^2\lambda^2/4}$, where n is an integer, λ is the wavelength of the light which the FZP is designed for and f is the designed focal length of the FZP. The focal length of 150 μm at an optical wavelength of 660 nm was set, the spacings and widths of the Fresnel zones are calculated with different values of n (n=1, 2, 3, . . . , 15). In a particular case, 15 alternate zones on a chip are present. The stepwise edge of rings for the high order n is attributed to the coarse step size in the movement of galvo mirrors. FIG. 16B shows the measured contrast for each zone in comparison to the theoretical value. The radius of the central zone is 10 μm, and the lens radius is about 40 μm. To demonstrate the lensing effect, we measure the cross-sectional intensity distribution in the focal plane with a plane wave broadband source illumination of the PAE-fabricated FZP, and the result is shown in FIG. 20c. A simulated intensity profile with a monochromatic visible light (660 nm) focused by a conventional lens (focal length of 150 μm) is shown in FIG. 20d for comparison. Due to the fact that a broadband light source is used in the experiment whereas a monochromatic source is used in simulation, the lateral width of the experimentally measured focal spot is larger as it is a net combination of many focal points produced by different wavelengths. The detailed description of the optical system used for characterization is explained in supplementary materials.

Figure 17:
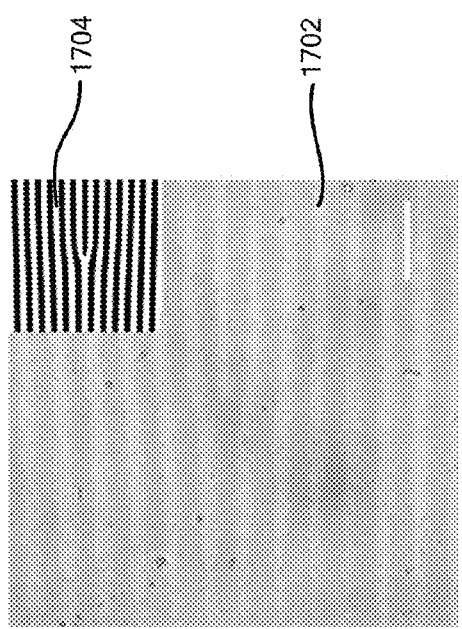
FIG. 17 is a bright-field image of a PAE-fabricated fork dislocation grating for generating optical vortices at a focal plane in accordance with an embodiment of the present invention.

PAE may be used to fabricate a fork dislocation grating 1702 in order to produce an optical vortex, as shown in FIG. 17 where the inset represents a schematic 1704. Passage of a plane wave through this holographic structure results in a beam that carries orbital angular momentum (OAM). Optical vortices have been widely studied and play an important role in optical communications and particle trapping. The PAE-fabricated fork grating has a period of 10 μm, a 50% duty cycle and a topological charge l=1.

Application to Nanotweezers

In addition to fabricating flat optical components, PAE, in accordance with embodiments of the present invention, may advantageously also be applied to locally shape the trapping landscape of the nanoantenna array 100. Plasmonic optical trapping has become a popular application of nanoantennas. The enhanced electromagnetic-field confinement offered by nanoantennas enables efficient trapping of micro and nano-objects using low input optical power densities. It was previously shown that plasmon induced heating effect can result in an alteration of the plasmon resonance of the p-BNAs by photothermally changing the morphology of the Au nanoparticles. It was shown that this effect could be used to tune the local potential energy landscape of the p-BNAs.

In accordance with embodiments of the current invention, PAE provides a method to selectively etch out the gold nanoantennas and thus form inactive trapping regions. PAE results in zero net optical trapping force at the etched areas leaving unetched areas unaffected. Consequently the trapping effect is more robust in the PAE fabricated channels since a deeper potential well is created compared with that done by plasmon-assisted heating. Furthermore, optofluidic channels etched by PAE can be made in real time and subsequent optical trapping can be performed in the same aqueous solution.

Figure 18A:
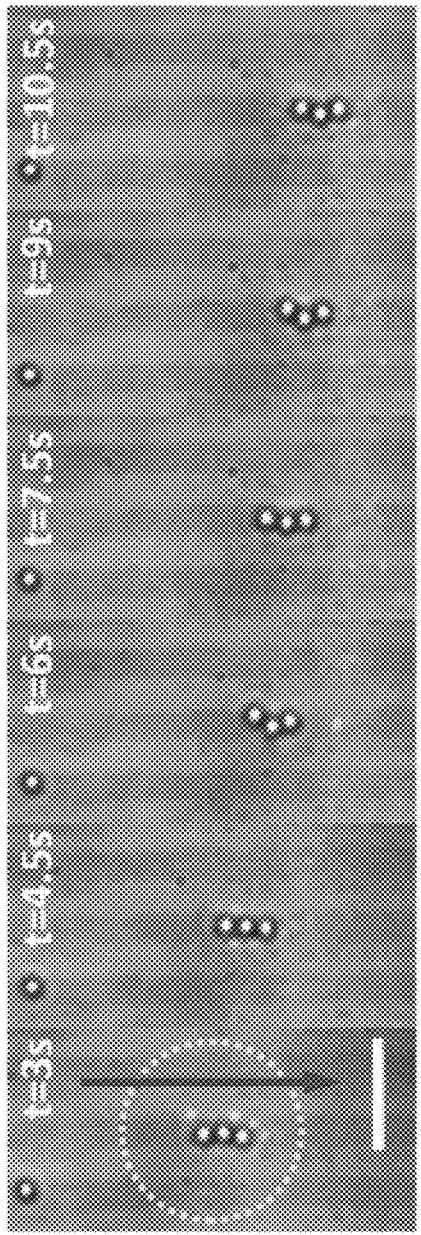
FIGS. 18A-18D show trapping of particles in predefined plasmonic trapping patterns.
Figure 18D:
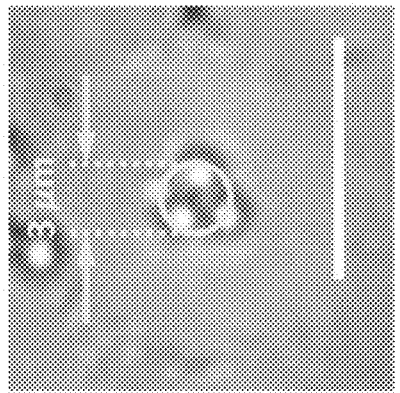
Figure 18C:
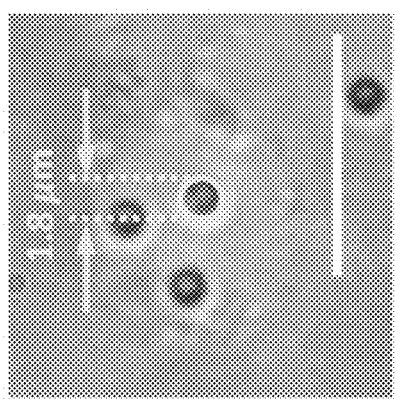
Figure 18B:
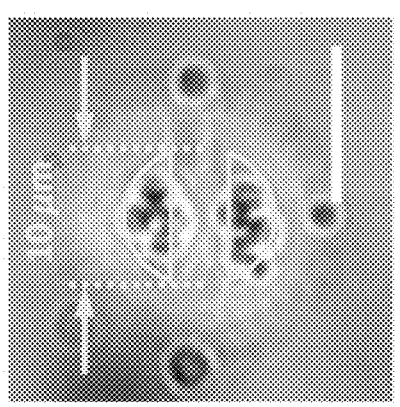

To demonstrate the application of PAE, in accordance with the present invention, to plasmonic trapping, PAE was applied to create predefined trapping areas using approximately 35.4-mW/μm² of intensity at the focal plane. As a result, gold nanoantennas with 35-nm gap size are removed from the silica pillars in the exposed area and preserved at the unexposed area. These unexposed gold nanoantennas provide a large trapping force, at resonance, of ~0.02 pN. Specifically, three kinds of predefined trapping patterns were fabricated: a grating pattern of several line-shaped channels, a pattern of two adjacent crescent-shaped channels with a radius of ~5-μm and a 2.5-μm wide isolation belt, and a pattern of a circular channel of two different radii. For trapping, a water-based colloidal suspension of 1-μm-diameter $SiO_2$ particles is injected into the water solution. Each fabricated pattern is illuminated with an approximately collimated, 25-μm-diameter excitation beam obtained by focusing a 660-nm, horizontally polarized CW laser beam using a 0.6-NA objective. It is observed that particles are trapped in the predefined channels for all patterns, as shown in FIGS. 18A-18D. For the pattern of line-shaped channels, 3 particles in a chain are confined in a narrow channel as observed in FIG. 18A. Despite the activation of the next predefined channel which is 5 μm away in distance, all particles remain in a chain only within the single channel, proving the existence of a sharp potential gradient at the edge of the channel. Next, by translating the sample stage vertically, and hence the p-BNA chip 100 retained on the sample stage, the particles move downward, in the opposite direction, as shown in FIG. 18A. When the crescent-shaped channels are illuminated, a cluster of particles is dragged toward the trap by convection and redistributed in the shape of an isolated crescent (FIG. 18B). Once all the particles become stabilized, the separation between two clusters is clearly observed. Moreover, as depicted in FIGS. 18C and 18D, a predefined trapping area can be reduced in size, so that a fewer number of particles are allowed to be trapped until eventually single-particle trapping is achieved.

Doubly Heterogeneous Nanoantenna Arrays

The results shown in FIGS. 19A-19C demonstrate another great advantage of the p-BNA platform and PAE: the flexibility to create doubly heterogeneous nanoantenna arrays. The illumination system discussed above is focused at the plane of nanoantenna arrays to scan the left half region of the 80×80-$\mu m^2$ p-BNA chip. After applying PAE, a 50-nm layer of Ti is deposited onto the entire p-BNA template through e-beam evaporation so as to fabricate doubly heterogeneous nanoantenna arrays, where the left half region that is etched consists of nanoantenna arrays with a 50-nm Ti layer on $SiO_2$ pillars, while the right half region that is unetched consists of nanoantenna arrays with a 50-nm Ti layer stacked on a 50-nm Au layer that sits on $SiO_2$ pillars. Calculated optical response of our etched and unetched regions is shown in FIG. 19A, while measured response is shown in FIG. 19B. The optical response of unetched and etched areas is assessed by measuring the spectral reflectance $R=1-R_{raw}/\max(R_{raw})$, where $R_{raw}$ is the raw reflectance obtained by focusing a white light source onto modified regions. It was observed that the reflectance of the p-BNAs with the single Ti layer exhibits a dip around 550 nm while that of the metal-stacking p-BNAs exhibits a redshifted-dip around 590 nm; note that both are blue-shifted compared to the original gold p-BNAs before PAE. In the SEM shown in FIG. 19C, the left two columns of the p-BNA structure represent the scanned etched area, where the dark regions on top of the silica pillars indicate the 50-nm single layer of Ti. The right two columns of the p-BNA structure represent the unetched area where the metal-stacked p-BNAs are fabricated with a 50-nm Ti layer deposited on top of a 50-nm Au layer. The physical appearance at the boundary between the etched and unetched areas of the p-BNA arrays is clearly distinguishable under SEM. However, as also seen in FIG. 19C, the shape of the second layer of Ti cannot precisely replicate that of the first layer of Au, as Ti accumulates on the side wall of the Au layer as well. The uneven height of the second layer of Ti and the change in the radius of curvature of the nanoantennas attribute to the slight discrepancy in the reflectance curves observed between simulated and experimental results. Nonetheless, in this case, PAE provides an extra degree of freedom in manipulating the optical properties of such fabricated planar optical components.

The embodiments of the invention described above are intended to be merely exemplary; numerous variations and modifications will be apparent to those skilled in the art. All such variations and modifications are intended to be within the scope of the present invention as defined in any appended claims.

We claim:

1. A method for producing a custom plasmonic potential energy landscape for optically trapping particles, the method comprising:
    a. forming a structure that comprises an array of pillars coupled to a substrate having a substantially planar surface, the pillars characterized by a thermal conductance less than 0.1 µW/deg, the pillars capped by a conducting particle atop each insulating pillar such that pairs of neighboring conducting particles are separated with respect to each other by no more than 50 nm; and
    b. deforming neighboring pillars in such a manner as to plastically vary a spacing separating neighboring conducting particles in a specified pattern.

2. A method in accordance with claim 1, wherein deforming neighboring pillars comprises exciting plasmon modes in the conducting particles with an electron beam thereby inducing a gradient force between neighboring conducting particles.

3. A method in accordance with claim 1, wherein the conducting particles include substantially metallic caps.

4. A method in accordance with claim 3, wherein the metallic caps are substantially triangular.

5. A method in accordance with claim 1, wherein the substrate includes a substantially planar surface.

6. A method in accordance with claim 1, wherein the pillars are substantially transparent in a specified portion of the electromagnetic spectrum.

7. A method in accordance with claim 1, wherein the substrate and the pillars are composed of an identical material.

8. A method in accordance with 5, further comprising depositing a layer of conducting material intervening between the substantially planar surface of the substrate and the pillars.

9. A method in accordance with claim 1, wherein the substrate and the pillars are $SiO_2$.

10. A method in accordance with claim 8, wherein the step of depositing a layer of conducting material intervening between the substantially planar surface of the substrate and the pillars includes depositing indium tin oxide.

* * * * *